US009228570B2

(12) United States Patent
Roy

(10) Patent No.: US 9,228,570 B2
(45) Date of Patent: Jan. 5, 2016

(54) METHOD AND APPARATUS FOR SMALL SATELLITE PROPULSION

(75) Inventor: Subrata Roy, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 459 days.

(21) Appl. No.: 13/578,797

(22) PCT Filed: Feb. 16, 2011

(86) PCT No.: PCT/US2011/025087
§ 371 (c)(1),
(2), (4) Date: Aug. 13, 2012

(87) PCT Pub. No.: WO2011/103194
PCT Pub. Date: Aug. 25, 2011

(65) Prior Publication Data
US 2012/0304618 A1     Dec. 6, 2012

Related U.S. Application Data

(60) Provisional application No. 61/304,915, filed on Feb. 16, 2010.

(51) Int. Cl.
*B64G 1/40* (2006.01)
*F03H 1/00* (2006.01)

(52) U.S. Cl.
CPC .............. *F03H 1/0037* (2013.01); *B64G 1/405* (2013.01); *B64G 1/406* (2013.01); *F03H 1/00* (2013.01); *F03H 1/0006* (2013.01); *F03H 1/0087* (2013.01); *F03H 1/0093* (2013.01)

(58) Field of Classification Search
CPC ....... F03H 1/00; F03H 1/0006; F03H 1/0087; F03H 1/0093; B64G 1/406
USPC ..................................... 60/200.1, 202, 203.1
See application file for complete search history.

(56) References Cited

U.S. PATENT DOCUMENTS 4,169,351 A    10/1979   Barber
4,838,021 A     6/1989   Beattie
(Continued)

FOREIGN PATENT DOCUMENTS

EP    0903487 A2    3/1999
EP    1445465 A1    8/2004
(Continued)

OTHER PUBLICATIONS

Auweter-Kurtz "Heterogenious Domain Decomposition Methods for Compressible Magneto-plasma Flows" from Hyperbolic Problems: Theory, Numerics, Applications vol. 1, 2001, p. 89.*
(Continued)

*Primary Examiner* — Phutthiwat Wongwian
*Assistant Examiner* — William Breazeal
(74) *Attorney, Agent, or Firm* — Saliwanchik, Lloyd & Eisenschenk

(57) ABSTRACT

In a propulsion system, an electrohydrodynamic (EHD) body force is used to control the flow of a propellant through a micro channel, expansion slot, plenum chamber, or other flow region and thereby increase the specific impulse created by a propulsion system. In an embodiment, a plurality of electrodes are arranged and powered to create a plasma discharge, which can impart an EHD body force to a fluid. Various configurations of electrodes can be used to control the flow of the fluid into, out of, or through the flow region. In an embodiment, the use of EHD body forces can reduce, or substantially eliminate, shear forces on the surface of a plenum chamber, micro channel, or expansion slot of the propulsion system, resulting in a smooth flow of the propellant and increased thrust.

40 Claims, 31 Drawing Sheets

(56) References Cited

U.S. PATENT DOCUMENTS

| | | | |
|---|---|---|---|
| 5,020,411 | A | 6/1991 | Rowan |
| 5,052,638 | A | 10/1991 | Minovitch |
| 5,239,820 | A | 8/1993 | Leifer et al. |
| 5,300,861 | A * | 4/1994 | Helgesen et al. ......... 315/111.41 |
| 5,592,055 | A * | 1/1997 | Capacci et al. .......... 315/111.21 |
| 5,947,421 | A | 9/1999 | Beattie et al. |
| 6,121,569 | A | 9/2000 | Miley et al. |
| 6,131,385 | A | 10/2000 | Lewis, Jr. et al. |
| 6,135,394 | A | 10/2000 | Kamel et al. |
| 6,293,499 | B1 | 9/2001 | MacGillivray et al. |
| 6,334,302 | B1 | 1/2002 | Chang-Diaz |
| 6,373,023 | B1 | 4/2002 | Hoskins et al. |
| 6,530,212 | B1 | 3/2003 | Phipps et al. |
| 6,769,241 | B2 | 8/2004 | Spanjers et al. |
| 7,183,515 | B2 | 2/2007 | Miller et al. |
| 7,269,940 | B2 | 9/2007 | Wiseman |
| 7,464,902 | B2 | 12/2008 | Leyre et al. |
| 7,506,497 | B2 | 3/2009 | Roy |
| 7,509,795 | B2 | 3/2009 | Allen |
| 7,581,380 | B2 | 9/2009 | Wahl |
| 7,857,254 | B2 | 12/2010 | Parks |
| 2003/0213874 | A1 | 11/2003 | Ockels et al. |
| 2007/0044450 | A1 | 3/2007 | Kuninaka |
| 2007/0126292 | A1 | 6/2007 | Lugg |
| 2008/0134663 | A1 | 6/2008 | Totani et al. |
| 2009/0153015 | A1 | 6/2009 | King |

FOREIGN PATENT DOCUMENTS

| | | | | |
|---|---|---|---|---|
| JP | 1310179 | A | 12/1989 | |
| WO | WO-01/18948 | A1 | 3/2001 | |
| WO | WO2008/016928 | A1 * | 2/2008 | ............. B64C 39/02 |
| WO | WO2009/015371 | A2 * | 1/2009 | ............. G01N 27/26 |

OTHER PUBLICATIONS

Zakrzwski "Pulsed Plasma Thruster (PPT) Summary" p. 1 and 2, 2005, http://eo1.gsfc.nasa.gov/new/validationreport/Technology/Documents/Summaries/08-PPT_Rev-0.pdf.*

Grubisic "On-a-chip microdischarge thruster arrays inspired by photonic device technology for plasma television", ESA, Oct. 2009, p. 4 executive summary, p. 3 and 4. http://eprints.soton.ac.uk/268040/.*

Giacomazzi, E., et al., "Miniaturized Propulsion," Propulsion 2000—Phase II Final Report for European Space Agency, Feb. 2003.

Hrbud, I., et al., "Review of RF Plasma Thruster Development," $30^{th}$ International Electric Propulsion Conference, Sep. 2007, Florence, Italy.

Hunyadi, G., et al., "The University Nanosat Program: An Adaptable, Responsive and Realistic Capability Demonstration Vehicle," *Proceedings of the 2004 IEEE Aerospace Conference*, Mar. 2004, pp. 2850-2858, vol. 5.

Ketsdever, A.D., et al., "Performance Testing of a Microfabricated Propulsion System for Nanosatellite Applications," *Journal of Micromechanics and Microengineering*, Dec. 2005, pp. 2254-2263, vol. 15, No. 12.

Konstantinov, M.S., et al., "The Use of a Solar Electrojet Propulsion System for Jupiter Satellite Injection," *Cosmic Research*, Mar. 2002, pp. 186-193, vol. 40, No. 2.

Lee, R.H., et al., "Free Molecule Micro-Resistojet: Nanosatellite Propulsion," AIAA Paper No. 2005-4073, $41^{st}$ AIAA/ASME/SAE/ASEE Joint Propulsion Conference & Exhibit, Jul. 2005, Tucson, AZ.

Raju, R., et al., "Modeling Single Component Fluid Transport Through Micro Channels and Free Molecule Micro-Resistojet," AIAA Paper No. 2004-1342, $42^{nd}$ Aerospace Sciences Meeting and Exhibit, Jan. 2004, Reno, NV.

Roy, S., et al., "Modeling Gas Flow Through Microchannels and Nanopores," *Journal of Applied Physics*, Apr. 2003, pp. 4870-4879, vol. 93, No. 8.

Veselovsky, I.S., "Non-Local Dissipative Structures in the Solar Corona: Flaring Loops," *Proceedings of SOHO 11 Symposium, "From Solar Min to Max; Half a Solar Cycle with SOHO"*, Mar. 2002, pp. 461-464, Davos, Switzerland.

* cited by examiner

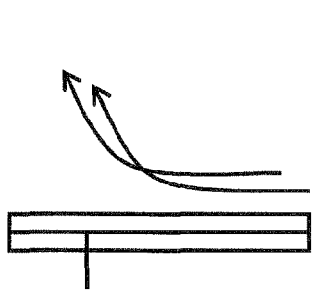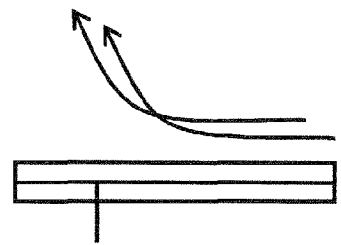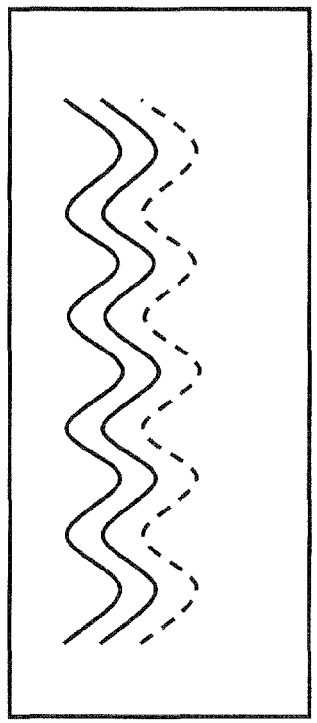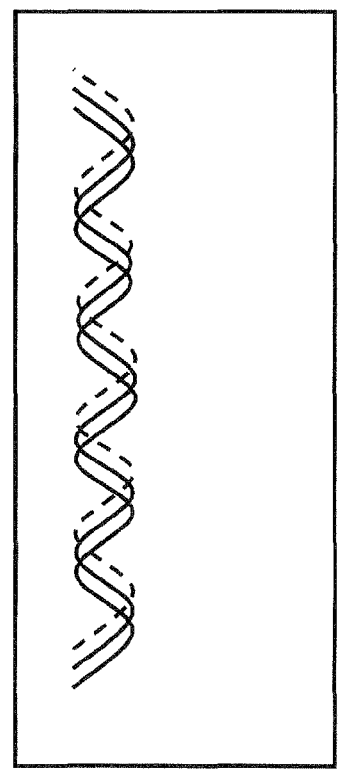
FIG. 18
FIG. 19

(b) Swirl pumping (a) Straight pumping

METHOD AND APPARATUS FOR SMALL SATELLITE PROPULSION

CROSS-REFERENCE TO RELATED APPLICATIONS

The present application is the U.S. national stage application of International Patent Application No. PCT/US2011/025087, filed Feb. 16, 2011, which claims the benefit of U.S. Provisional patent application No. 61/304,915, filed Feb. 16, 2010, both of which are incorporated by reference herein in their entirety, including any figures, tables, or drawings.

BACKGROUND OF INVENTION

Small satellite propulsion systems generally must be small in size while generating high specific impulse with limited power. Such systems typically produce impulse bits on the order of $10^{-6}$ N-s while using very small propellant flow rates controlled by microvalves.

Propulsion systems are known that pass a gas propellant through an expansion slot with heated walls. The gas molecules become heated as they collide with the walls. The heated molecules have increased energy and therefore pass through the expansion slot with greater speed producing greater thrust and specific impulse.

Electrothermal propulsion systems are also known in which a pair of electrodes are used to produce a plasma discharge in a cavity. When a propellant is introduced into the cavity, the discharge couples energy into the propellant and localized stochastic heating results raising the enthalpy of the propellant.

Electrostatic or ion propulsion systems apply a static electric force (Coulomb Force) to a propellant including charged particles. Magnetic or electromagnetic fields have also been used to increase the flow of a charged propellant (applying a Lorentz Force). Such applications have been used in combination with heating techniques to further increase thrust in a rocket engine. See for example U.S. Pat. No. 6,334,302.

As exploration and other space applications progress propulsion systems are desired that produce greater thrust or specific impulse while maintaining a small payload, form factor, or power requirement. In addition, propulsion systems are desired that produce sufficient thrust or specific impulse while reducing the payload, form factor, or power required. These and/or other objectives can be met by embodiments of the subject invention as further described below.

BRIEF SUMMARY

Embodiments of the present invention are directed to methods and apparatus for small satellite propulsion. In an embodiment, a body force is used to control the flow of a propellant through a micro channel, expansion slot, plenum chamber, or other flow region and thereby increase the specific impulse created by a propulsion system. In an embodiment, a plurality of electrodes are arranged and powered to create a plasma discharge, which can impart a body force to a fluid. In specific embodiments, the plasma discharge can be one or more of the following: surface discharge, volume discharge, and surface dielectric barrier discharge. In specific embodiments the body force generated by the plasma discharge is one or more of the following: electrohydrodynamic (EHD) body force, electrostatic body force, magnetohydrodynamic body force. Various configurations of electrodes can be used to control the flow of the fluid into, out of, or through the flow region. In an embodiment, a surface discharge can be produced by arranging and powering electrodes on one surface of a flow region. In an embodiment, a volumetric discharge can be produced by arranging and powering electrodes across the flow region.

In an embodiment of the subject invention, an expansion slot or micro channel can be formed with electrodes arranged therein. A small plasma discharge can be generated in the vicinity of an exposed (powered) electrode to induce an electrohydrodynamic (EHD) body force, which can induce flow of a propellant fluid in a particular direction, such as by generating a flow and/or increasing the speed of the flow, of a propellant fluid in a particular direction. The electrodes can be arranged in the expansion slot or micro channel as electrode pairs. One embodiment can incorporate electrode pairs on the same surface and maintained at a potential bias using steady, pulsed direct, or alternating current. Another embodiment can incorporate electrode pairs separated by an insulative material where one electrode of the pair is powered with dc or ac operating at a radio frequency with respect to the other.

In another embodiment, electrodes are arranged and powered such that an EHD body force is produced that induces flow of a propellant fluid into or out of an expansion slot or micro channel. In another embodiment, electrodes are arranged and powered such that an EHD body force is produced that induces flow of a propellant through a plenum chamber. In an embodiment, the use of EHD body forces can reduce, or substantially eliminate, shear forces on the surface of a plenum chamber, micro channel, or expansion slot of the propulsion system, resulting in a smooth flow of the propellant and increased thrust.

Propulsion systems in accordance with the invention can be used to induce flow in a variety of propellants. Flow can be induced in electrically non-conductive propellants and electrically conductive propellants. Embodiments used for inducing flow in electrically non-conductive propellants can incorporate electrodes coated with a material having insulating properties, such as a dielectric, or can incorporate exposed electrodes. Embodiments used for inducing flow in electrically conductive propellants can incorporate electrodes coated with a material having insulating properties, such as a dielectric material.

BRIEF DESCRIPTION OF DRAWINGS

FIG. 18 shows a specific embodiment having a serpentine turbulator design for creating a flow force directed away from the substrate.

FIG. 19 shows a specific embodiment having a serpentine turbulator design for creating a flow force directed toward the substrate.

DETAILED DISCLOSURE

Figure 1:
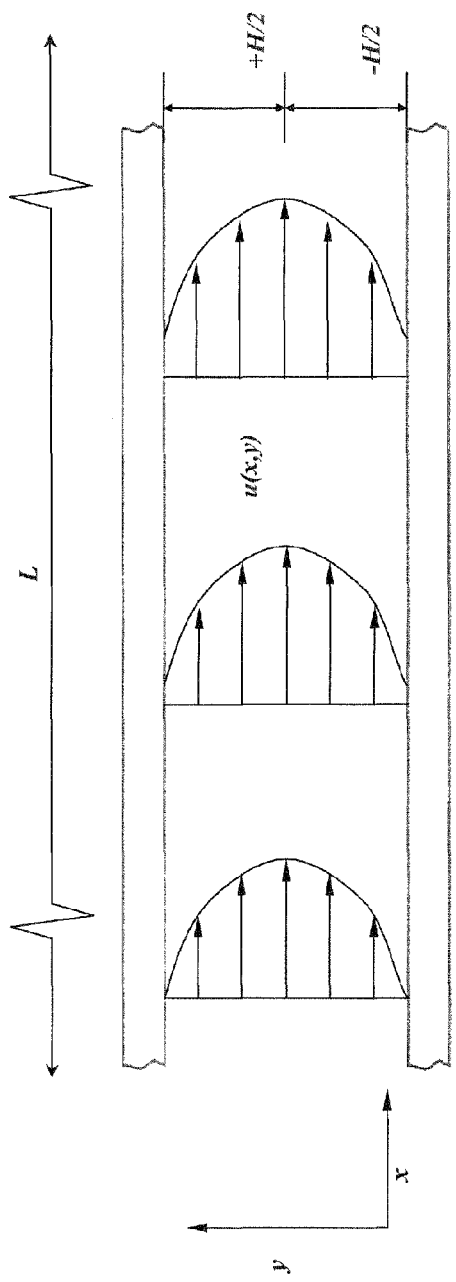
FIG. 1 shows fluid flow inside a micro channel in accordance with an embodiment of the subject invention.

Embodiments of the present invention are directed to methods and apparatus for small satellite propulsion. In an embodiment, a body force is used to control the flow of a propellant through a micro channel, expansion slot, plenum chamber, or other flow region and thereby increase the specific impulse created by a propulsion system. In an embodiment, a plurality of electrodes are arranged and powered to create a plasma discharge, which can impart a body force to a fluid. In specific embodiments, the plasma discharge can be one or more of the following: surface discharge, volume discharge, and surface dielectric barrier discharge. In specific embodiments the body force generated by the plasma discharge is one or more of the following: electrohydrodynamic (EHD) body force, electrostatic body force, magnetohydrodynamic body force. Various configurations of electrodes can be used to control the flow of the fluid into, out of, or through the flow region. In an embodiment, a surface discharge can be produced by arranging and powering electrodes on one surface of a flow region. In an embodiment, a volumetric discharge can be produced by arranging and powering electrodes across the flow region.

In an embodiment of the subject invention, an expansion slot or micro channel can be formed with electrodes arranged therein. A small plasma discharge can be generated in the vicinity of an exposed (powered) electrode to induce a body force, such as an electrohydrodynamic (EHD) body force, which can induce flow of a propellant fluid in a particular direction. The electrodes can be arranged in the expansion slot or micro channel as electrode pairs. One embodiment can incorporate electrode pairs on the same surface and maintained at a potential bias using steady, pulsed direct, or alternating current. Another embodiment can incorporate electrode pairs separated by an insulative material where one electrode of the pair is powered with dc or ac operating at a radio frequency with respect to the other. In an embodiment, one electrode of the pair is powered at RF voltages, while the other electrode of the pair is grounded. In another arrangement, both electrodes are powered with signals separated by a beat frequency.

In another embodiment, electrodes are arranged and powered such that a body force, such as an EHD body force, is produced that induces flow of a propellant fluid into or out of an expansion slot or micro channel. In another embodiment, electrodes are arranged and powered such that an EHD body force is produced that induces flow of a propellant through a plenum chamber. In an embodiment, such electrodes are arranged near the exit-plane of the plenum chamber in order to induce flow toward one or more exits. In an embodiment, the use of body forces, such as EHD body forces, can reduce, or substantially eliminate, shear forces on the surface of a plenum chamber, micro channel, or expansion slot of the propulsion system, resulting in a smooth flow of the propellant and increased thrust.

Propulsion systems in accordance with the invention can be used to induce flow in a variety of propellants. Flow can be induced in electrically non-conductive propellants and electrically conductive propellants.

In an embodiment, some electrodes can be fully or partially submerged or embed in an insulative material, such as a dielectric. In an embodiment, some electrodes can be coated with a material having insulating properties, such as a dielectric material. In an embodiment, some electrodes can be exposed to the propellant.

In an embodiment, voltages are applied to different electrodes at different times in order to control the flow of fluid through the flow region. In an embodiment, a controller is provided that controls the timing of voltage application to the electrodes. In an embodiment, the controller is controlled according to a computer program stored on one or more computer-readable media.

In various embodiments, the flow region can have various configurations. In an embodiment, the flow region comprises one or more micro channels or expansion slots extending from a plenum chamber. Such conduits can have various cross-sections as further described below. In an embodiment, a channel or slot is formed having internal structures formed therein to further control flow through the conduit. In an embodiment, micro channels or expansion slots are formed having a uniform cross-section along their length. In another embodiment, such conduits can narrow or expand at one or both ends. In an embodiment, protrusions can be formed at the entrance, exit, or within such conduits to further direct the flow of a fluid into, out of, a through the conduit.

In an embodiment, a propulsion system is provided having a plenum chamber. In an embodiment, a thruster chip is incorporated into an exit-plane of the plenum chamber. In an embodiment, such a chip is incorporated into another portion of the propulsion system. In an embodiment, the thruster chip is a microelectromechanical systems (MEMS) device. In an embodiment, one or more expansion slots are formed in the chip. In an embodiment, one of the one or more expansion slots has a plurality of electrodes arranged on at least one side of the expansion slot such that when the electrodes are selectively powered greater fluid flow is induced through the expansion slot by means of body forces, such as EHD body forces. In an embodiment, such electrodes are arranged and selectively powered in order to control fluid flow through the propulsion system.

In an embodiment, EHD body forces are combined with other known techniques for increasing flow of a propellant through an expansion slot. For example, in an embodiment, portions of the expansion slot can be heated such that the enthalpy of the propellant increases through conduction, convection, or radiation of such heat to the propellant. In an embodiment, the enthalpy of the propellant is increased using plasma discharge. In an embodiment, electrostatic, magnetic, or electromagnetic forces are used to increase the flow of a charged propellant through a conduit. Other techniques for increasing flow of a propellant through an expansion slot are known in the art and can be used with the subject invention.

In an embodiment, electrodes are arranged to produce a discharge at an entrance of a micro channel or expansion slot to draw fluid into the channel or slot. For example, by arranging electrodes on either side of an entrance to an expansion slot counter-rotating vortices can be produced that draw fluid into the slot. The same or different principles can be applied at an exit to the slot to draw fluid out of the slot. In an embodiment, electrodes are arranged at or near the exit-plane of a plenum chamber and selectively powered to induce fluid flow toward the exit-plane.

In an embodiment, a plurality of electrodes is arranged and selectively powered to induce fluid flow through a micro channel, expansion slot, or other flow region. In an embodiment, a pair of electrodes, among the plurality, is arranged along a surface of the flow region. Power can be applied to one or both electrodes to produce a surface dielectric barrier discharge (DBD). The DBD can in turn produce a body force, such as an EHD body force, that induces flow in the fluid. In an embodiment, the body force is produced by powering an exposed electrode at RF voltages, while an embedded electrode is grounded. In another arrangement, both electrodes are powered with signals separated by a beat frequency.

In an embodiment, a pair of electrodes, among the plurality, is positioned across a portion of the flow region from each other, such that the flow region is intersected by a straight line drawn between a point on one of the pair of electrodes and a point one the other of the pair of electrodes. Power can be applied to one or both electrodes to produce a volumetric plasma discharge. The discharge can produce a body force, such as an EHD body force, that induces flow in the fluid. In an embodiment, the pair of electrodes is arranged on different surfaces forming the flow region. In an embodiment, the pair of electrodes is arranged on a curved or angled surface, such as a cylindrical surface. In an embodiment, one electrode of the pair is powered, while the other electrode of the pair is grounded. In another arrangement, both electrodes are powered at different voltages.

In an embodiment, pairs of electrodes, among the plurality, are powered in parallel (i.e., at the same time) to generate multiple plasma discharges within the flow region at the same time. In an embodiment, pairs of electrodes, among the plurality, are powered in series to generate sequential plasma discharges within the flow region. In an embodiment, a particular electrode, among the plurality, can be paired with a first electrode, among the plurality, to generate a first plasma discharge. Later, the particular electrode can be paired with a second electrode, among the plurality, to generate a second plasma discharge. Various configurations of electrodes can be used with the subject invention. Illustrative examples are provided below.

A specific embodiment can incorporate a power source; a first electrode in contact with a first dielectric layer and connected to the power source; a second electrode in contact with a second dielectric layer and connected to the power source; and a ground electrode. The power source drives the first electrode with a first ac voltage pattern with respect to the ground electrode and drives the second electrode with a second ac voltage pattern with respect to the ground electrode such that application of the first voltage pattern produces a first plasma discharge in a flow region, and a first electric field pattern in the flow region, and application of the second voltage pattern produces a second plasma discharge in the flow region and a second electric field pattern in the flow region. The first and second electrodes are offset along the direction of flow in the flow region and the first voltage pattern and the second voltage pattern have a phase difference such that the first and second electric fields drive flow in the flow region in different portions of the flow region at different times.

In an embodiment, the first dielectric and the second dielectric layer are arranged in a stacked configuration, such that the first dielectric layer contacts the second dielectric layer. The first electrode can be positioned near the flow region. The first dielectric can be positioned between the flow region and the second electrode such that both electrodes are positioned in the same direction from the flow region. Alternatively, the flow region, or at least a portion of the flow region can be positioned between the first and second electrodes. The first dielectric insulator layer and the second dielectric insulator layer have different dielectric strengths or can have the same dielectric strengths. The first electrode is offset from the second electrode in a direction parallel to a direction of flow in the flow region and one or more additional electrodes can be offset from the first and second electrodes and provide corresponding one or more additional electric fields to promote flow in the flow region.

In an embodiment, a propulsion system according to the subject invention requires less power and/or produces greater specific impulse than prior art systems. For example, in one embodiment, a propulsion system employing Free Molecule Micro Resistojet (FMMR) generated an effective specific impulse (Isp) of 48.1 s. In an embodiment, a propulsion system employing a cold/warm gas micronozzle generated an effective Isp of 42 s. An embodiment of the subject invention can produce an effective Isp of over 250 s. In an embodiment, less power is required to produce the same specific impulse as prior art systems. In an embodiment, sufficient thrust is produced for communication or maneuvering of a small satellite, such as a NanoSat, using less propellant, and therefore a smaller payload.

In an embodiment, a propulsion system according to the subject invention is suitable for communication and maneuvering of LEO NanoSat constellations. In an embodiment, 3-axis orbit maneuvers can be performed. In an embodiment, three-axis attitude stabilization can be performed. In an embodiment, high specific impulse of micro N-s is achieved.

In an embodiment, a propulsion system is provided that is small in size, but generates high specific impulse. In an embodiment, such a system produces impulse bits on the order of $10^{-6}$ N-s. In an embodiment, impulse bits of greater than $10^{-6}$ N-s are produced. In an embodiment, such a system uses very small propellant flow rates controlled by microvalves.

In an embodiment, a thruster chip is provided having one or more expansion slots for increasing flow of a propellant through a propulsion system. In an embodiment, a pair of electrodes is positioned in or near the expansion slot. In an embodiment, the pair of electrodes is configured such that when the pair is powered, a plasma discharge is generated, which in turn generates a body force, such as an EHD body force, that induces flow in the propellant. In an embodiment, the thruster chip is also heated to increase the enthalpy of the propellant. In an embodiment, a FMMR thruster chip is augmented with plasma producing electrodes. In an embodiment, less heat is required to produce the same specific impulse of an FMMR chip. In an embodiment, no heating element is utilized in the chip. In an embodiment, less power is required to produce the same specific impulse of an FMMR chip. In an embodiment, less chip volume is required to produce the same specific impulse of an FMMR chip. In an embodiment, the propellant includes charged particles and Coulomb and/or Lorentz forces are applied to the charged particles to induce flow in the propellant.

The figures of the subject invention are not to scale and the relative distances between electrodes and electrode pairs can vary from those shown.

FIG. 1 shows fluid flow inside a micro channel in accordance with an embodiment of the subject invention. As shown, the micro channel has a channel height H and a length L. In an embodiment, the micro channel also has width W in a dimension perpendicular to the x and y axis shown. As discussed below in relation to FIGS. 28 and 29, the micro channel can have various configurations and cross-sections. In an embodiment, the micro channel is composed of two parallel plates of length L and width W separated by a distance H. In the embodiment shown, the length L is in the same dimension as the intended streamwise flow of fluid through the micro channel.

Micro channels useable with the subject invention may vary in size and dimension. In an embodiment, the micro channel width W is equal to the channel height H. In an embodiment, the channel width W is considerably larger than the channel height H. In an embodiment, the channel width W is about 30 to 40 times greater than the channel height H. In an embodiment, the channel width W is less than about 30 times greater than the channel height H. In an embodiment, the channel width W is more than about 40 times greater than the channel height H. In an embodiment, the channel width W is less than the channel height H. The length L of the micro channel can also vary. In an embodiment, the length L of the micro channel is considerably greater than its width W. In an embodiment, the channel length L is about 75 to 150 times greater than the channel width W. In an embodiment, the channel length L is more than about 150 times greater than the channel width W. In an embodiment, the channel length L is less than about 75 times greater than the channel width W. In an embodiment, the channel length L is less than the channel width W.

In embodiments, the channel height H of the micro channel ranges from about 1 to 2 μm. In other embodiments, the channel height H of the micro channel ranges from about 100 to 300 nm. In other embodiments, the channel height H is less than about 100 nm. In other embodiments, the channel height H is more than about 2 μm. In a particular embodiment, the micro channel has height, width, and length of about 1.2, 40, and 4000 μm respectively. In another embodiment, the micro channel has height, width, and length of about 1.33, 52.25, and 7500 μm respectively.

In an embodiment, a plurality of electrodes are arranged along the length of the micro channel and powered to induce flow of a fluid through the micro channel. In an embodiment, electrodes are arranged at or near the entrance of the micro channel to draw fluid into the micro channel. In an embodiment, electrodes are arranged at or near the exit of the micro channel to draw fluid out of the micro channel. Various configurations of electrodes can be used with the subject invention. Illustrative examples are further discussed below.

Figure 2:
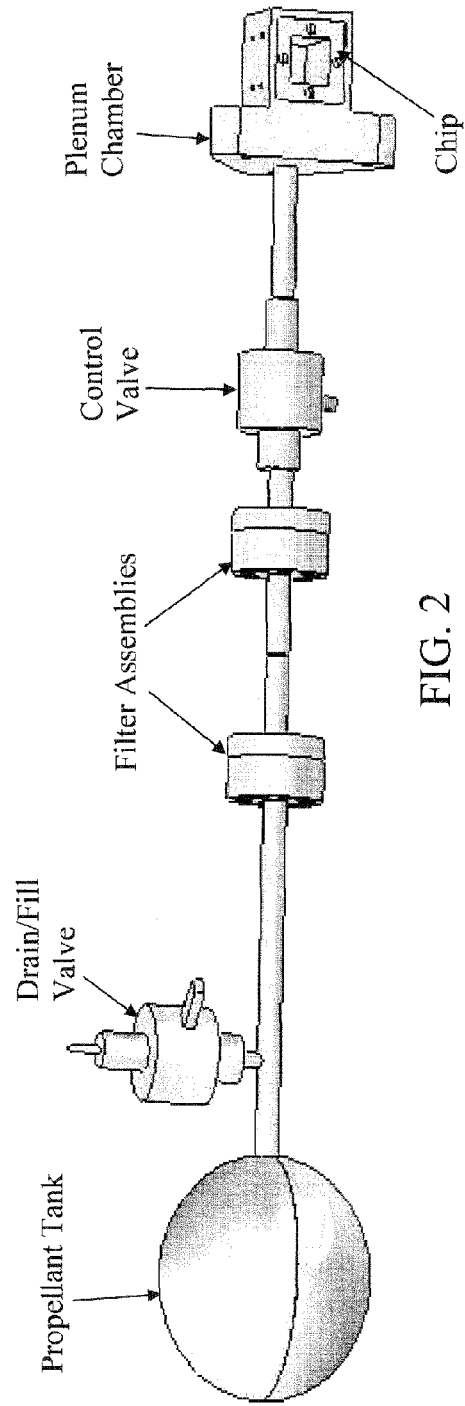
FIG. 2 shows a propulsion system in accordance with an embodiment of the subject invention.

FIG. 2 shows a propulsion system in accordance with an embodiment of the subject invention. The system of FIG. 2 is only an illustrative embodiment of the invention. Other embodiments of such a system may include more, fewer, or different components. Or the components shown may be differently arranged. The embodiment shown includes a propellant tank for storing a propellant fluid, a drain/fill valve for adding or removing such fluid, filter assemblies for filtering the fluid, a plenum chamber for controlling the release of the fluid outside the system, and a control valve for controlling the release of the fluid to the plenum chamber. In the embodiment shown, the plenum chamber comprises a thruster chip. In an embodiment, such a chip can be incorporated into a different portion of the system to control fluid flow. For example, such a chip could be incorporated into the control valve. In an embodiment, the plenum chamber can be made of Teflon. In an embodiment (not shown), the propulsion system and/or plenum chamber include one or more micro channels used to transport the propellant fluid, such as the micro channels described above in relation to FIG. 1.

Figure 3:
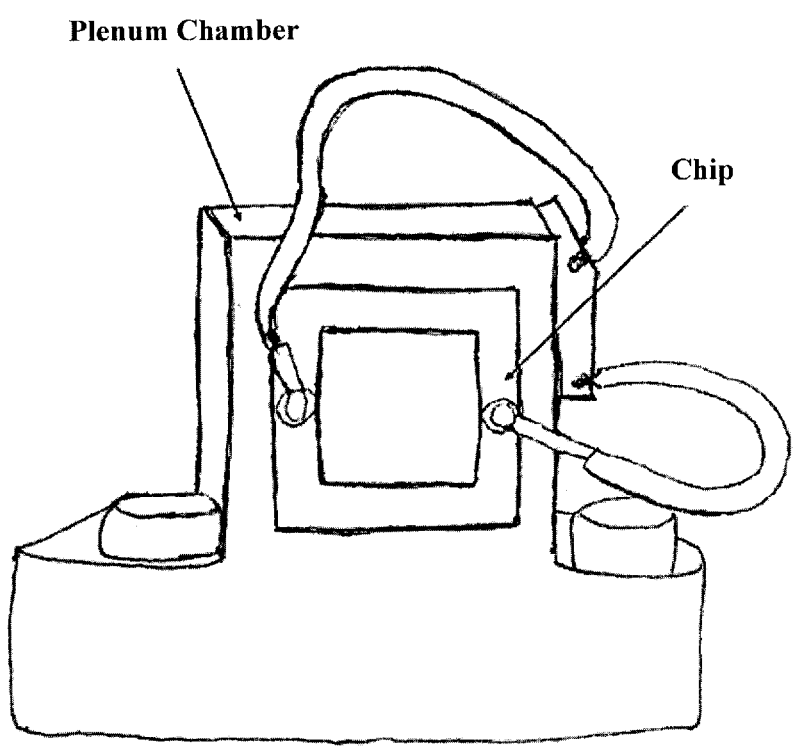
FIG. 3 shows a plenum chamber for a propulsion system in accordance with an embodiment of the subject invention.

FIG. 3 shows a plenum chamber for a propulsion system in accordance with an embodiment of the subject invention. In the embodiment shown, the plenum chamber comprises a thruster chip at its exit-plane. In a particular embodiment, the chip is situated about 1000 μm from the entrance of the plenum chamber. In other embodiments, the chip is situated closer to or further from the entrance. In an embodiment, such a chip can be incorporated into a different portion of the plenum chamber. In the embodiment shown, the thruster chip is powered via wires connected to the chip. In an embodiment, an alternating current is used to power the chip. In an embodiment, a direct current is used to power the chip. In an embodiment, the chip is powered at radio frequency (RF) voltages. In an embodiment, about 3 to 5 Watts are needed to power the chip in a Steady State and about 5 to 9 Watts are needed in a Transient State. In an embodiment, less than about 3 Watts are needed to power the chip in a Steady State. In an embodiment, less than about 5 Watts are needed to power the chip in a Transient State. In an embodiment, more than about 5 Watts are needed to power the chip in a Steady State. In an embodiment, more than about 9 Watts are needed to power the chip in a Transient State.

Various fluids can be used as a propellant in the propulsion system. In particular embodiments, Helium gas, Argon gas, Nitrogen gas, or water vapor is used. In a particular embodiment, about 0.8-1.7 mN of Thrust are generated using about 87-100 gm of water vapor propellant. In an embodiment, more Thrust is generated and/or less propellant is used.

Figure 4:
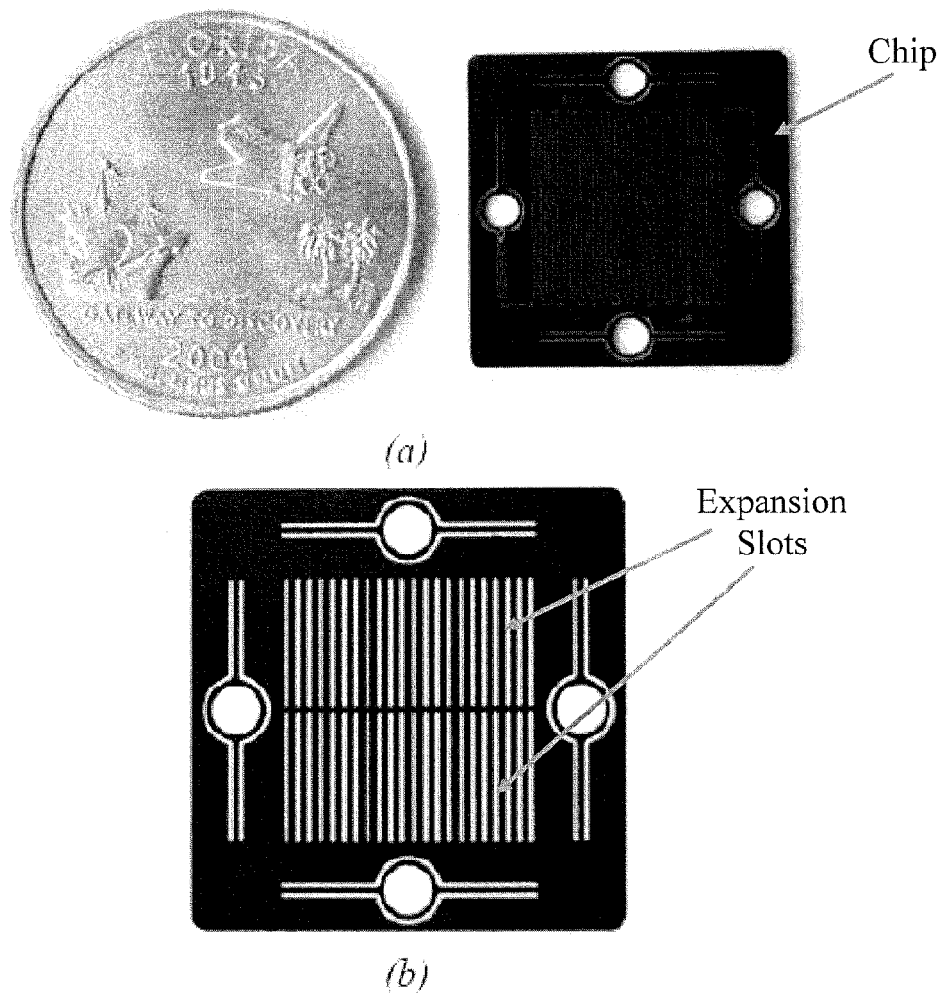
FIG. 4 shows a thruster chip in accordance with an embodiment of the subject invention.

FIG. 4A shows a thruster chip in accordance with an embodiment of the subject invention. In an embodiment, such a chip can be incorporated in a propulsion system such as the propulsion systems described above in relation to FIGS. 2-3. FIG. 4B shows locations of expansion slots in the thruster chip of FIG. 4A in accordance with an embodiment of the subject invention. In the embodiment shown, 44 expansion slots are formed in the chip in two rows of 22. In other embodiments, fewer or more expansion slots can be used or they can be differently arranged. In a particular embodiment, 40 expansion slots are used. In the embodiment shown, the chip is 18.6×18.6 mm and 500 μm thick. In embodiments, the chip can be larger or smaller. In a particular embodiment, the chip is 400 μm thick. In the embodiment shown in FIG. 4A, a serpentine heating element delivers heat to each expansion slot. In another embodiment, no heating element is included or only some of the expansion slots are heated.

Figure 5:
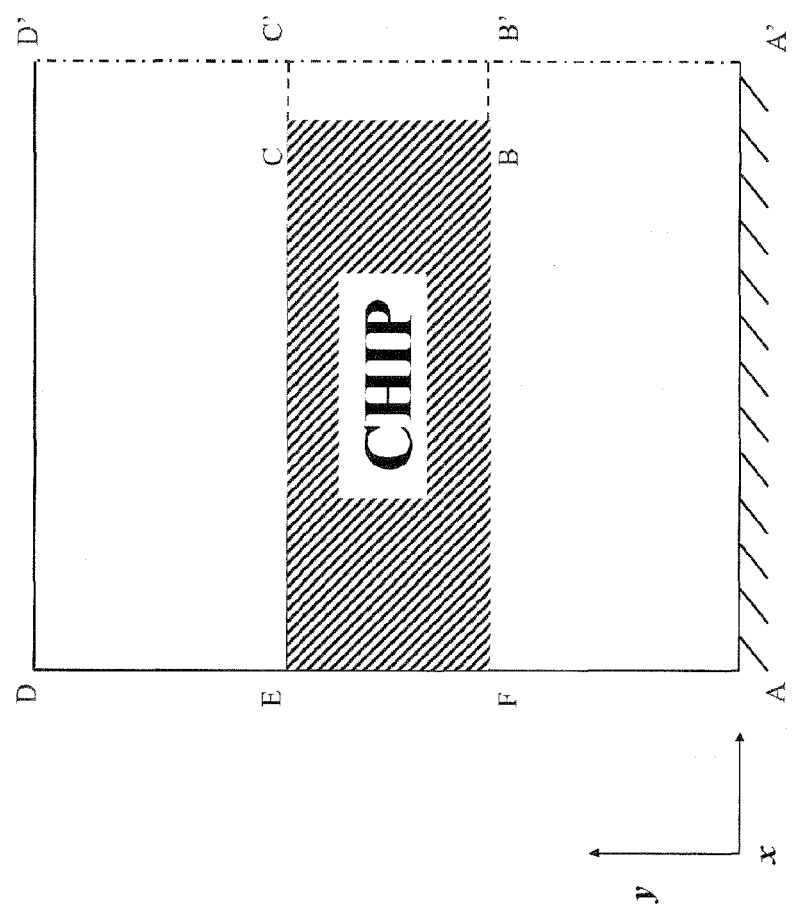
FIG. 5 shows geometry of a single expansion slot in a thruster chip in accordance with an embodiment of the subject invention.

In an embodiment, the thruster chip is positioned across the exit-plane of a plenum chamber as shown in FIG. 3. In an embodiment, thrust is produced as a propellant fluid passes from the plenum chamber, through an expansion slot in the thruster chip, to the outside. FIG. 5 shows geometry of a single expansion slot in a thruster chip in accordance with an embodiment of the subject invention. In an embodiment, the portion below the "chip" (section FB'A'A) shown in FIG. 5 represents the inside of the plenum chamber, and the portion above (section EC'D'D) represents the outside. In an embodiment, the thruster chip includes a plurality of such slots as discussed above. In an embodiment, each slot has two 90° bends. In an embodiment, the propellant fluid enters the plenum chamber through propellant inlets and passes through the expansion slots to the outside. The geometry shown in FIG. 5 is symmetrical along the slot width. The section A'D' shows the line of symmetry for the slot width. BB' and CC' are the one-half of the slot width and represent the slot throat and slot exit, respectively. In an embodiment, AF represents the inlet through which the propellant fluid molecules enter the system in the x-direction. The section FBCE is the thruster chip. In an embodiment, the molecules pass through the expansion slot, half of which is represented here by the section BB'C'C, to the outside (section EC'D'D).

In embodiments, one or more expansion slots are configured similar to the micro channels discussed above in relation to FIG. 1: wherein the channel height H is analogous to the expansion slot width, half of which is represented here by the section BB'; the channel width W is analogous to the slot length, which in FIG. 5 extends in a dimension perpendicular to the x and y axis (extending into or out of the page); and the channel length L is analogous to the expansion slot or chip thickness (i.e., the flow length), represented here by the section BC. Expansion slots useable with the subject invention may vary in size and dimension. In embodiments, the expansion slots have the same proportions and/or dimensions as the micro channels discussed above. The electrode configurations useable with the expansion slots can also mirror those described in relation to micro channels as further discussed below.

In an embodiment, the slot length is about 50 to 100 times greater than the slot width. In an embodiment, the slot length is less than about 50 times greater than the slot width. In an embodiment, the slot length is more than about 100 times greater than the slot width. In an embodiment, the slot length is less than the slot width. In an embodiment, the slot thickness is about 4 to 8 times greater than the slot width. In an embodiment, the slot thickness is less than about 4 times greater than the slot width. In an embodiment, the slot thickness is more than about 8 times greater than the slot width. In an embodiment, the slot thickness is less than the slot width.

In embodiments, the slot length of an expansion slot ranges from about 3 mm to about 1 cm in length. In embodiments, the slot length is less than 2 mm long. In embodiments, the slot length is more than 1 cm long. In embodiments, the slot width ranges from about 100-200 μm. In embodiments, the slot width is less than 100 μm. In embodiments, the slot width is more than 200 μm. In embodiments, the slot or chip thickness ranges from about 400 μm to 1.5 mm. In embodiments, the slot thickness is less than 400 μm. In embodiments, the slot thickness is more than 1.5 mm. In a particular embodiment, an expansion slot has width, thickness, and length of about 100 μm, 500 μm, and 6.5 mm respectively. In another embodiment, an expansion slot has width, thickness, and length of about 100 μm, 400 μm, and 1 cm respectively. As discussed below in relation to FIG. 29, the expansion slot can have various cross-sections. As discussed below in relation to FIG. 28, in embodiments, the width of the expansion slot is not uniform across its thickness. Parameters for a particular embodiment are listed in the table below:

| System Parameters | Value |
| --- | --- |
| Gas | Argon |
| Slot width, w (μm) | 100 |
| Slot or chip Thickness, t (μm) | 400 |
| Distance from Plenum, d (μm) | 1000 |
| Temperature at inlet, Ti (K) | 300 |
| Chip temperature, Tw (K) | 300, 600 |
| Pressure at inlet, Pi (Pa) | 50 |
| Exit Pressure, Po (Pa) | 3.9 |
| R (kJ/kg · K) | 208.1 |
| Cp (k/kgK) | 520.03 |
| M (N-s/m2) | 2.22 × 10−5 |
| K (W/k · m) | 0.0207 |
| γ | 1.667 |
| Number of slots | 40 |

In an embodiment, a plurality of electrodes are arranged along the length of an expansion slot and powered to induce flow of a fluid through the slot. In an embodiment, electrodes are arranged at or near the entrance of the expansion slot to draw fluid into the slot. In an embodiment, electrodes are arranged at or near the exit of the expansion slot to draw fluid out of the slot. Various configurations of electrodes can be used with the subject invention. Illustrative examples are further discussed below.

Figure 6:
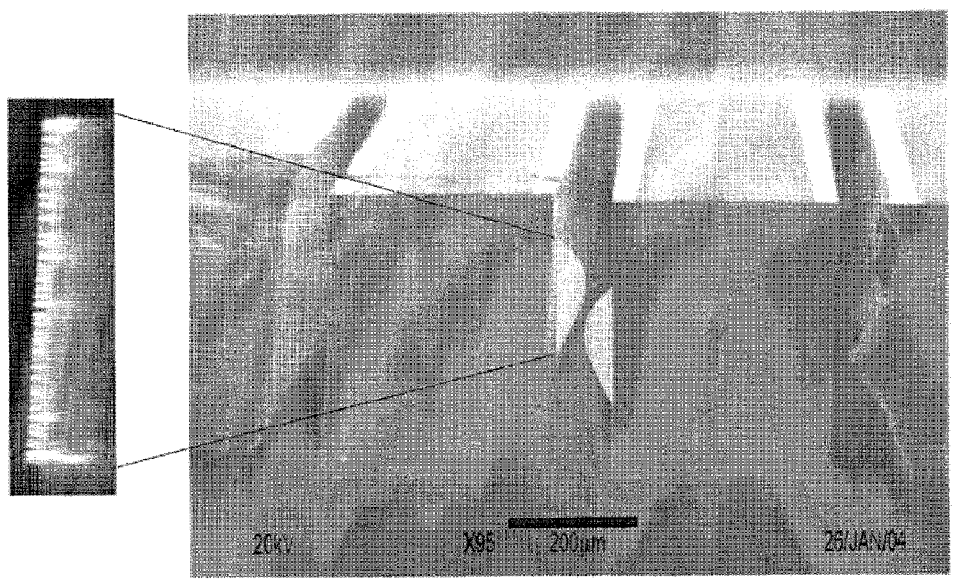
FIG. 6 shows a simulation of induced plasma within an expansion slot in accordance with an embodiment of the subject invention.

In an embodiment, pairs of electrodes are arranged and powered so as to generate a plasma discharge. FIG. 6 shows a simulation of induced plasma within an expansion slot in accordance with an embodiment of the subject invention. The image shown is substantially a cross-section of a thruster chip divided along the length of a number of expansions slots, such as the expansion slots discussed above in relation to FIGS. 3-5. In an embodiment, a propellant fluid enters the expansion slots from the bottom of the image and flows through the slots substantially toward the top of the image. A scale of for the image is provided at the bottom. In the embodiment shown, plasma is induced along both sides of an expansion slot. As discussed below, various electrode configurations can be used to induce plasma in the expansion slot.

Figure 7:
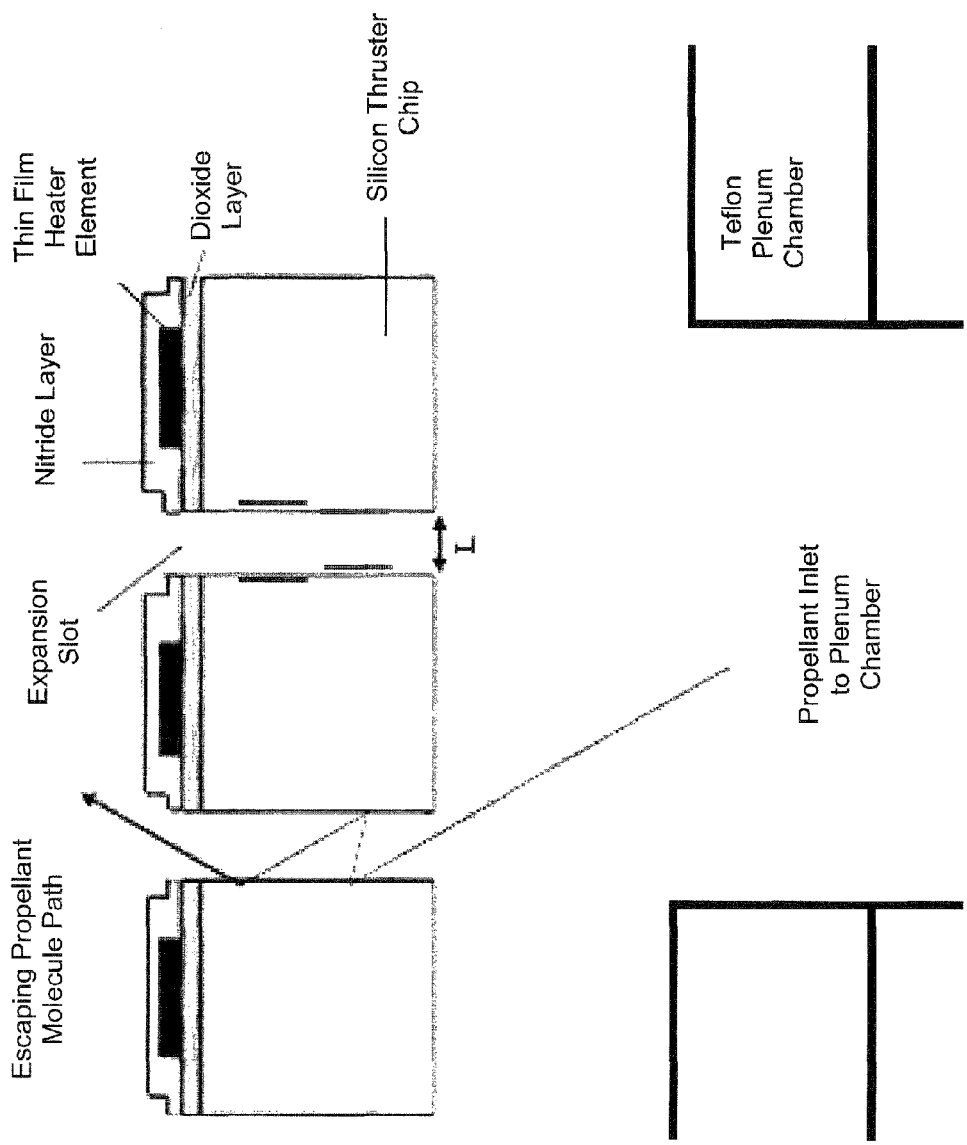
FIG. 7 shows operation of a propulsion system in accordance with an embodiment of the subject invention.

FIG. 7 shows operation of a propulsion system, such as the propulsion system of FIG. 2, in accordance with an embodiment of the subject invention. This diagram is substantially a cross-section of a plenum chamber and thruster chip divided along the length of a number of expansions slots. The diagram is not to scale. The structures shown can represent various plenum chamber, thruster chip, and expansion slot configurations, such as the chambers, chips, and expansion slots discussed above in relation to FIGS. 2-6. In the embodiment shown, a propellant fluid is introduced into the plenum chamber via a propellant inlet. The fluid passes through one or more expansion slots formed in the thruster chip. In an embodiment, the thruster chip is positioned along an exit-plane of the plenum chamber. In an embodiment, the propellant exits the plenum chamber by passing through one or more expansion slots. The vertical lines shown along the interior surfaces of the expansion slot labeled L represent a possible electrode configuration usable with the subject invention. In the embodiment shown, a pair of electrodes is positioned on each side of the expansion slot L. In an embodiment, power is applied to each pair of electrodes in order to generate a plasma discharge in the expansion slot L. In an embodiment, a surface discharge is generated. In an embodiment, a volumetric discharge is generated. In an embodiment, multiple discharges are generated at the same time. In an embodiment, multiple discharges are generated sequentially. In an embodiment, a plasma discharge in turn generates an EHD body force that induces flow in the propellant fluid inside the expansion slot L. In an embodiment, the EHD body force induces greater flow of the propellant fluid in the general direction of the exit of the expansion slot L. In an embodiment, greater thrust or specific impulse is generated by the propulsion system through the use of such electrodes as described above.

Other electrode configurations can be used with the subject invention. In embodiments, electrodes are positioned on surfaces other than the interior surfaces of an expansion slot. For example, electrodes can be formed on the underside of the thruster chip (e.g., a surface of the thruster chip facing the inside of the plenum chamber) between expansion slots. In an embodiment, electrodes can be formed on the topside of the thruster chip (e.g., a surface of the thruster chip forming an external surface of the plenum chamber) between expansion slots. As further discussed below in relation to FIG. 13, in an embodiment, electrodes can be arranged on a thruster chip on either side of an expansion slot and powered to create counter-rotating vortex tubes that direct the flow of a propellant into or out of the expansion slot. In embodiments, electrodes are positioned on other surfaces that make up the plenum chamber or propulsion system. For example, electrodes can be positioned on a propellant tank, drain/fill valve, filter assembly, control valve, micro channel, or other conduit used in the propulsion system. In an embodiment, when such electrodes are powered they induce flow in a propellant fluid used in the propulsion system.

In embodiments, other methods of increasing flow through an expansion slot, micro channel, or other conduit are used with the subject invention. For example, in the embodiment shown, the thruster chip and expansion slots are heated by means of a thin film heater element applied to the top of the chip. Other methods of applying heat in an expansion slot are known in the art and can be used with the subject invention. In this embodiment, as the propellant passes through the expansion slots, the propellant undergoes gas-surface interactions with the surface of the expansion slots resulting in elevated temperature and energy of the propellant. In an embodiment, the propellant fluid passes through the inlet at a pressure Pi and temperature Ti. In an embodiment, the chip is maintained at a constant temperature Tw. In an embodiment, the plenum chamber is also maintained at a constant temperature Tp. In an embodiment, the inlet is maintained at a constant temperature Ti. In an embodiment, the inlet and plenum chamber are maintained at the same temperature. In an embodiment, the propellant molecules undergo gas-surface collisions with these surfaces and gain energy in the process when these surfaces are maintained at an elevated temperature. In an embodiment, greater thrust or specific impulse is generated by the propulsion system through the use of such heated expansion slots.

In the embodiment shown in FIG. 7, the plenum chamber is composed of TEFLON™ and the thruster chip is composed of Silicon, Dioxide, and Nitride. In other embodiments, other suitable materials are used.

In an embodiment, a propulsion system of the present disclosure involves a multilayer arrangement of dielectric barriers between sets of electrodes. In an embodiment, several layers of a dielectric substrate are formed, each layer enveloping an electrode. In one embodiment, the inter-electrode gap is kept at a few microns to decrease the power requirement. Various configurations include differences in the number of insulation layers, insulation thicknesses, dielectric strengths, number of electrodes, electrode widths, inter-electrode gaps, applied frequencies, duty cycles, and voltages, for example.

Several advantages of various embodiments of a propulsion system in accordance with the subject invention can include one or more of the following: active flow control; increased area of plasma formation; significant increase in body force generation for higher flow inducement; significantly lower power requirement; no mechanical components; decreased cost; and microscale applications.

Figure 8:
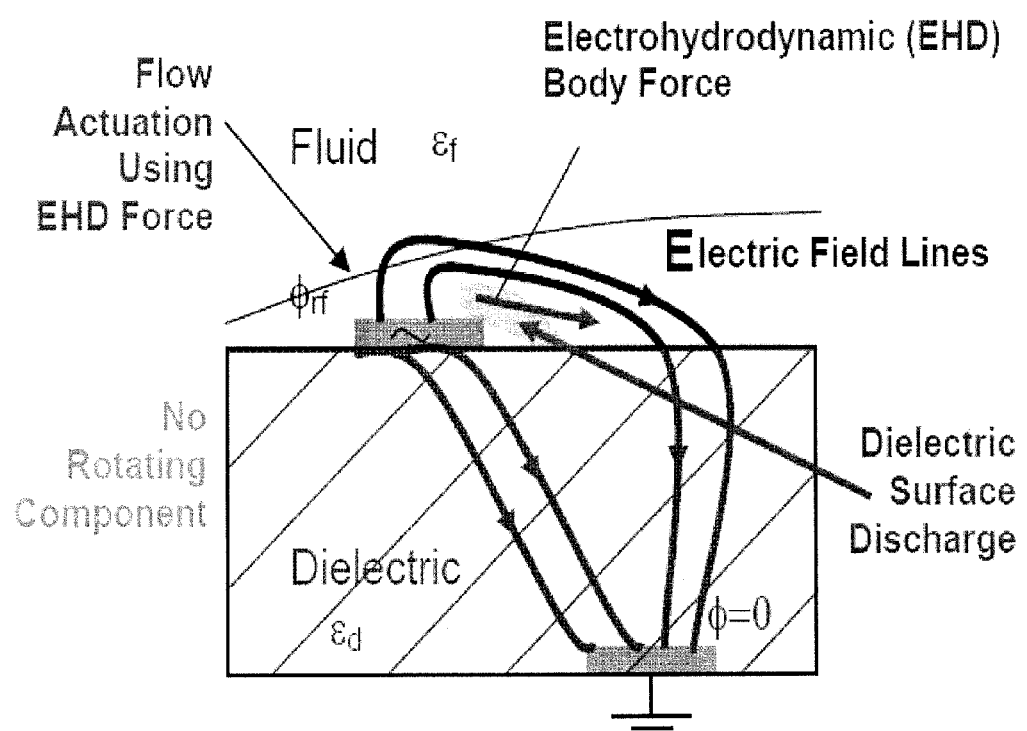
FIG. 8 is a schematic diagram for flow actuation using surface dielectric barrier discharge (DBD).
Figure 10:
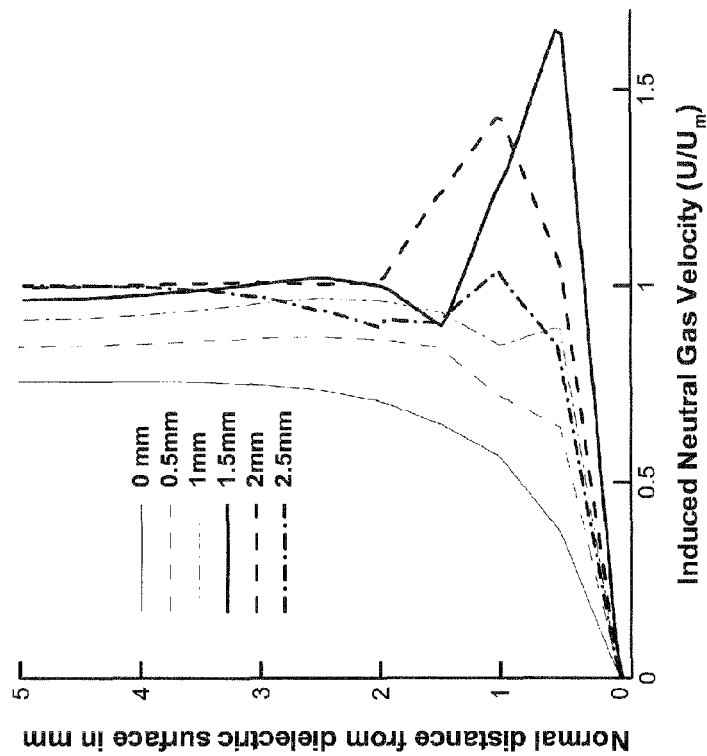
FIG. 10 is a diagram showing predicted streamwise gas velocity profiles induced by a body force, shown along different locations along the flow under a quiescent gas environment.
Figure 9:
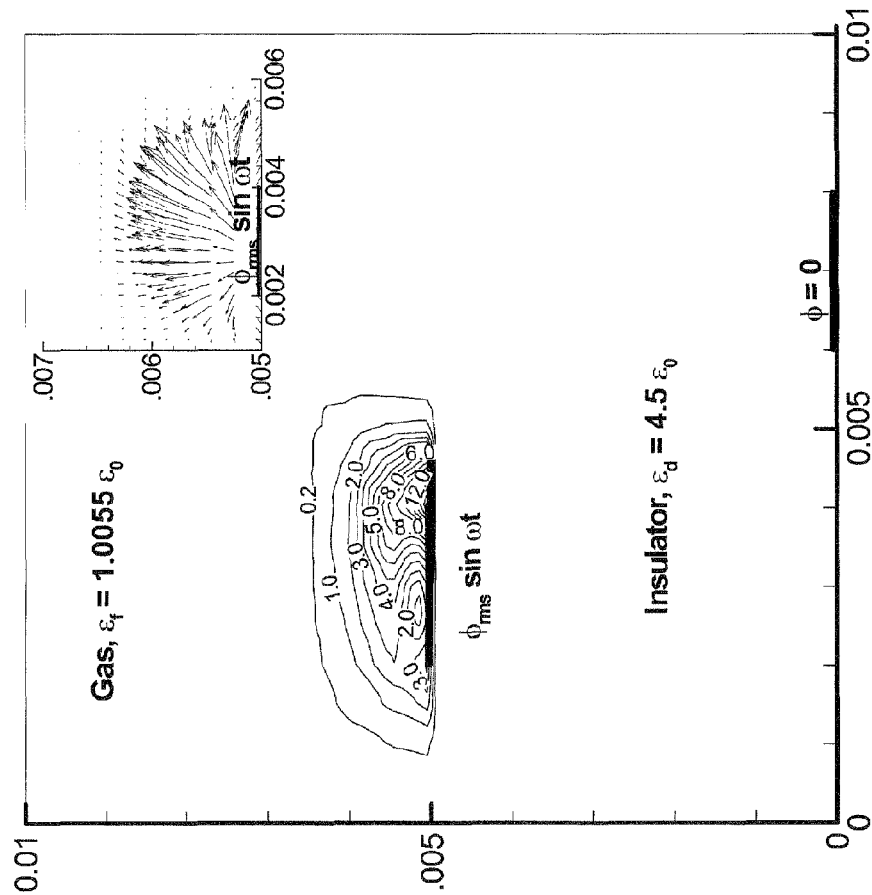
FIG. 9 is a diagram showing force variation of electric body force qE about the electrode-dielectric surface.

FIGS. 8-10 illustrate the process through which an electrodynamic qE body force actively controls the flow through an inducement of a wall jet in a quiescent condition. FIG. 8 shows the schematic for flow actuation using surface dielectric barrier discharge (DBD). Two electrodes are employed: the first exposed to the flow and the second embedded in the dielectric and displaced in the streamwise direction relative to the exposed electrode. The surface discharge so created contrasts with the volumetric effect observed when the electrodes are separated by the fluid. Typically, the actuator is excited by powering the exposed electrode at RF voltages, while the embedded electrode is grounded. In another arrangement, both electrodes are powered with signals separated by a beat frequency. The excitation induces a complex unsteady interaction between the two electrodes and the fluid, details of which depend on frequency, voltage, geometric configuration, and dielectric constants of the media.

In the surface discharge, within a very short time after breakdown, the discharge buildup at the dielectric surface sets off microdischarges of nanosecond duration, limiting the electric field at the location of the microdischarge such that the charge current at this position is cut off. Experimental evidence shows that there is no runaway state for the parameters under consideration and that an asymptotic (quasi) periodic state is reached, with a dominant frequency that is locked to the input perturbation. For a given interelectrode distance, as the applied voltage becomes sufficiently large, the dielectric surface adjacent to the RF electrode produces a barrier discharge, which weakly ionizes the surrounding gas. The combination of electrodynamic body force and collisional processes, whose detailed mechanics remain a matter of current research, ultimately transfers momentum acquired from the electric field by the charged particles to the neutrals which are the primary species.

Advantages of dielectric barrier-based discharges include, for example, an absence of moving parts, rapid on-off features, and the ability to apply body forces in a relatively precise manner by deploying advanced electromagnetic technology. Embodiments of the subject invention are thus suitable for flow control in micro channels or expansion slots, for example.

The electric field E exerts a net force qE through the space charge (q) separated plasma within the DBD. This microfilamentary discharge sustains an optical glow within a half cycle through many current pulses of nanosecond duration. The plasma can induce air flow up to several meters per second in atmospheric pressure. The parameters controlling such force include the applied voltage, frequency, dielectric characteristics, and the asymmetric configuration of the electrodes. The asymmetry in the location of the electrodes, coupled with the phase shift of the electrode when multiple devices are present, yields a directional asymptotic "push" on the bulk gas. The thickness of the exposed electrode affects the thrust produced by the actuator.

The variation of electric body force qE about the electrode-dielectric surface in FIG. 9 is predicted by using a multispecies formulation anchored in a high-fidelity finite element based multiscale ionized gas (MIG) flow code. The MIG code employs a self-consistent approach to model the near-wall physics of plasma gas interactions. The method is based on a versatile finite-element (FE) procedure adapted from fluid dynamics to overcome the stiffness of the equations generated by multi-species charge separation phenomena. A 2D bilinear finite element formulation is chosen with $4^{th}$ order Runge-Kutta time marching. The solution process consists of two steps. The first solves the equations for charge and electric field simultaneously. In the second step, the force so obtained is transferred to the airfoil after rotation and scaling. The MIG code also solves for the self-consistent fluid response. This implicitly assumes that the near-wall local fluid neutral velocity does not influence the distribution of electric parameters. This requires that the fluid density and pressure, or collisionality, are not much different from those employed in the plasma calculation.

The result computed for helium working gas describes a localized peak of the body force in the vicinity of the exposed electrode powered with a RF voltage of 1 kV rms at 5 kHz. The predicted streamwise gas velocity profiles induced by this force are shown along different locations in FIG. 10 under a quiescent gas environment. For atmospheric air, the induced peak velocity of the wall jet is about 1-2 m/s, which may be further accentuated by using a polyphase power supply. While this creates striking flow control effects at low speeds, the induced momentum may be too small for sufficiently actuating the high speed flows.

A first principle electrohydrodynamic (EHD) formulation can be used for modeling plasma discharge induced flows. Reported experiments and theoretical predictions have been traditionally limited to low speeds and low power due to the problems of arcing and low conversion of electrical energy into gas momentum. Thus, the embodiments of the subject invention are directed to multibarrier actuators using several layers of dielectric barriers with embedded electrodes for moderate to high speed applications. Embodiments of the subject multibarrier actuators may vary in the number of insulation layers, insulation thickness, dielectric strength, number of electrodes, electrode width, electrode gap, applied frequency, duty cycle, and voltage, for example.

Traditionally, in electrical glow discharge, a DC voltage potential is placed across two electrodes. If the voltage potential is gradually increased, at the breakdown voltage $V_B$, the current and the amount of excitation of the neutral gas becomes large enough to produce a visible plasma. According to Paschen's law, the breakdown voltage for a particular gas depends on the product (p.d) of the gas pressure and the distance between the electrodes. For any gas, there is a unique p.d value referred to as the Stoletow point where volumetric ionization is the maximum. The Stoletow point for air requires a minimum $V_B$=360 V and p.d=5.7 Torr-mm.

For flow control applications near atmospheric pressure, the allowable electrode spacing necessary for maximum volumetric ionization is d=0.077 mm. In many applications, this is an impractical limitation. One solution to this limitation comes from the development of RF glow discharge using an a.c. voltage potential across the electrodes. The frequency of the current should be such that within a period of the a.c. cycle, electrons travel to the electrodes and generate a charge, while the heavier ions do not. Based on reported experiments, the time-averaged plasma parameters for atmospheric glow discharge has air or other gases at 760±25 torr with relative humidity below 14%. A homogeneous glow can be maintained at about 3 to 10 kHz RF and rms electrode voltage between about 3 to 16 kV. For a gap distance of about 2-5 mm, the electron number density is ~$10^{17}$ $m^{-3}$ and volumetric power dissipation is about 1 MW/$m^3$.

Figure 11:
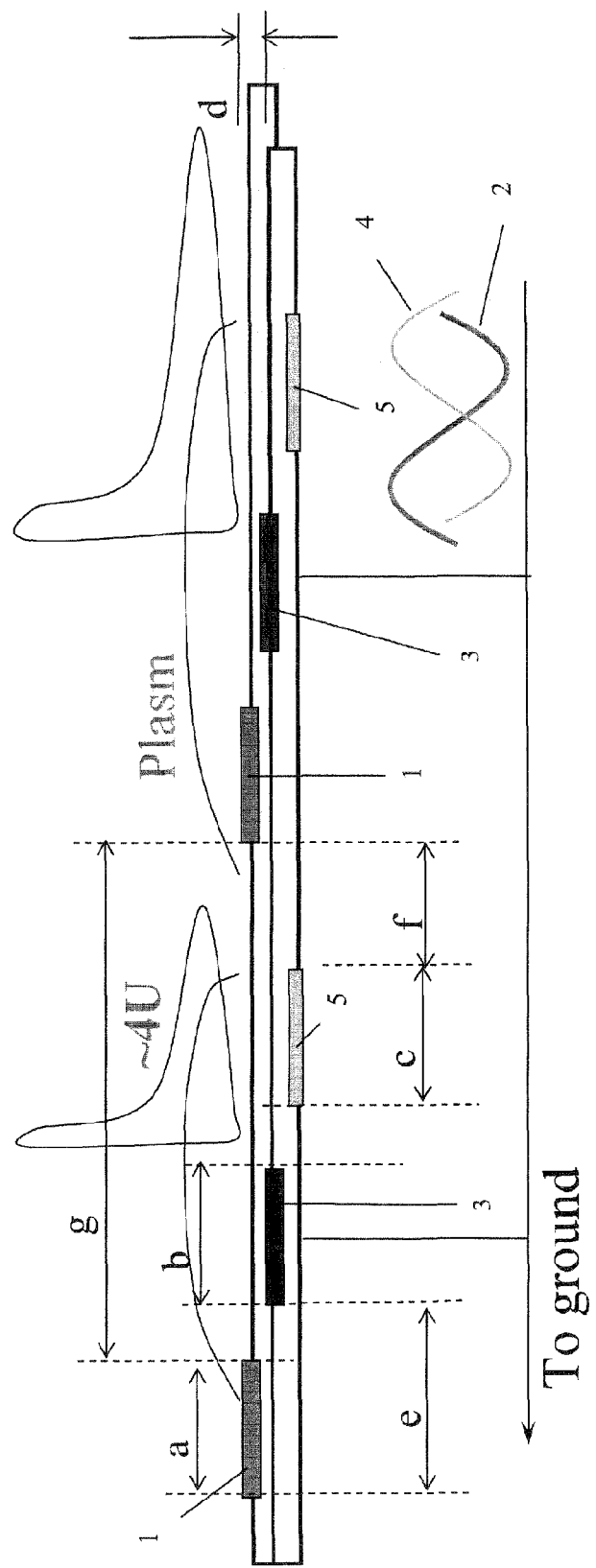
FIG. 11 is a schematic diagram of one embodiment of a multilayer actuator in accordance with the subject invention.

In an embodiment, a multilayer actuator is designed with several layers of dielectric, each incorporating an electrode. FIG. 11 shows a schematic for one embodiment of a bi-layer design as an example. The interelectrode distance d is kept at a few microns, thereby reducing or eliminating the kHz RF power requirement. In a preliminary experiment, the electrodes are powered with wall ac supply (60 Hz) through neon transformers and tested for a stable glow. The voltage pattern 2 shown at the bottom right of FIG. 11 is applied between the electrode 1 nearest the surface and the ground electrode 3 in the middle of the dielectric layers, while voltage pattern 4 is applied between the electrode 5 farthest from the surface and the ground electrode 3. The electrode 1 nearest the surface can be exposed to the fluid in the flow region or can have a coating separating the electrode 1 surface from the fluid in the flow region, depending on the fluid properties (e.g., electrical conductivity) and other design parameters. The stable discharge at single phase power induces a significantly large body force in an extended region, resulting in a possible order of magnitude increase in wall jet velocity with minimum arcing. Initial measurements show at least four times increase in the induced jet velocity (~4 U). By using a set of phase lagged electrodes powered by a pulsed ac/dc supply, the induced wall jet can be improved by an order of magnitude, such as up to about 7-10 m/s.

Figure 12:
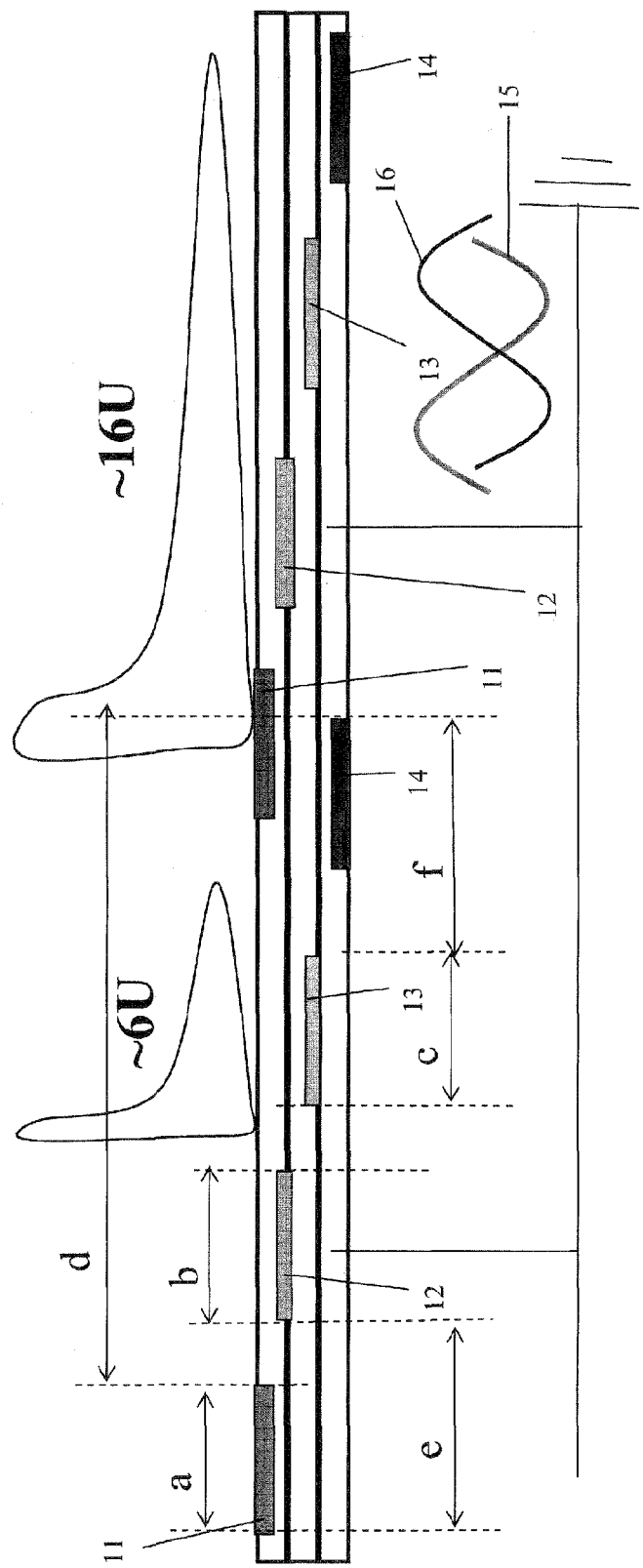
FIG. 12 is a schematic diagram of a second embodiment of a multilayer actuator of the present disclosure, with an increased number of layers.

FIG. 12 shows an extremely large acceleration gain (i.e. >15 U induced velocity) for the multilayer arrangement. The voltage pattern 15 is applied between the electrode 11 nearest the surface and the ground electrode 13, while the voltage pattern 16 is applied between electrode 12 and the ground electrode 13. This may be achieved for the same energy density of plasma as of a monolayer arrangement. In additional embodiments, the number of layers can be increased to increase the plasma coated surface area. This means more EHD body force and resulting gas velocity are induced. Also, at this velocity, small scale turbulence may dominate the flow actuation process. Further, the micron level insulator thickness may influence the induced force. The electrodes can be positioned and driven in a variety of configurations and patterns, respectively, to induce a variety of flow patterns. In embodiments, as discussed above, such electrodes can be positioned on various surfaces making up a propulsion system. For example, such electrodes can be positioned on a propellant tank, drain/fill valve, filter assembly, control valve, micro channel, expansion slot, or other conduit used in the propulsion system.

Figure 13:
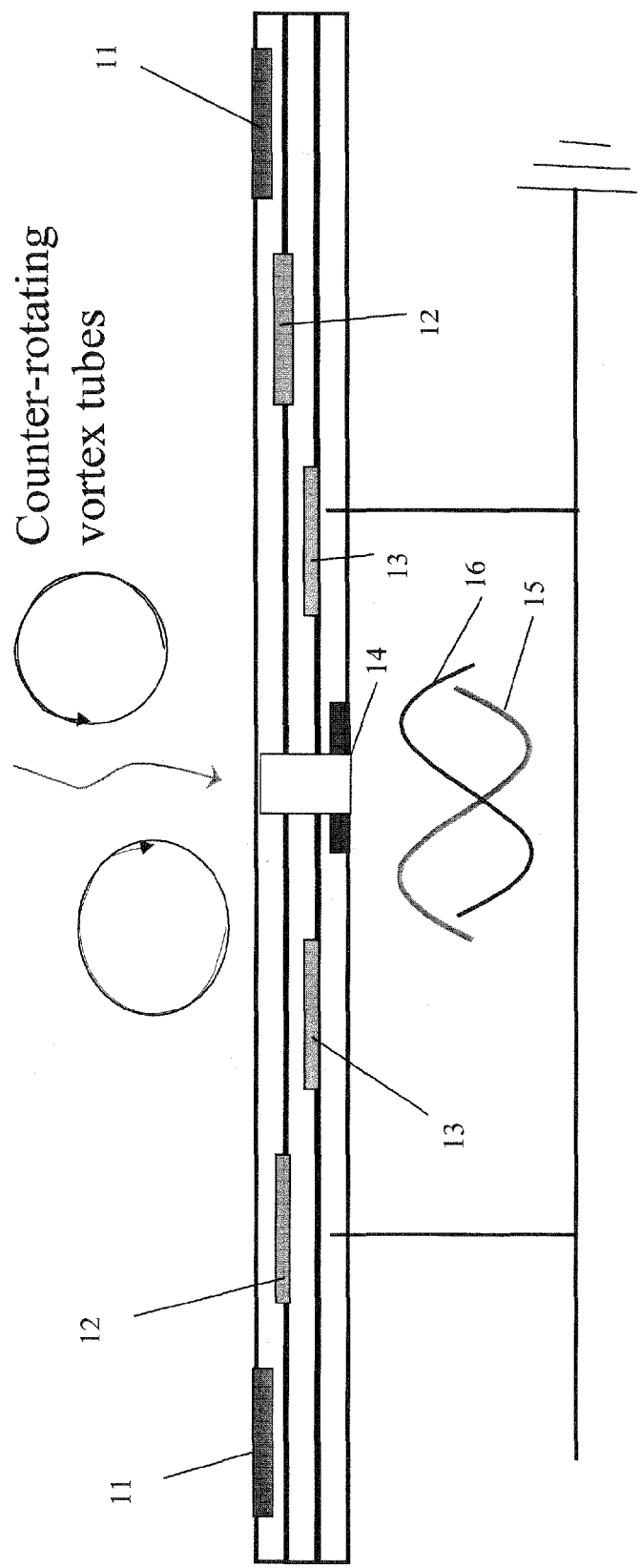
FIG. 13 is a schematic diagram showing that flow actuation may be used for creating large or small counter rotating vortices.

As an example, as shown in FIG. 13, flow actuation may be used for creating large or small counter rotating vortices. As discussed above, in embodiments, such vortices can be used to direct flow into or out of a conduit such as an expansion slot, micro channel, or other conduit. Based on the applied phase difference, these counter rotating vortex tubes can be slightly or greatly misaligned. In an embodiment, various vortex structures similar to those forming about different body shapes can be created. For example, the Karman vortex street for flow over a cylindrical object can be easily generated for electrode sets operating at a phase difference of p/2 with a select duty cycle. A powerful alternative for the synthetic jets can also be implemented with this design.

Figure 14:
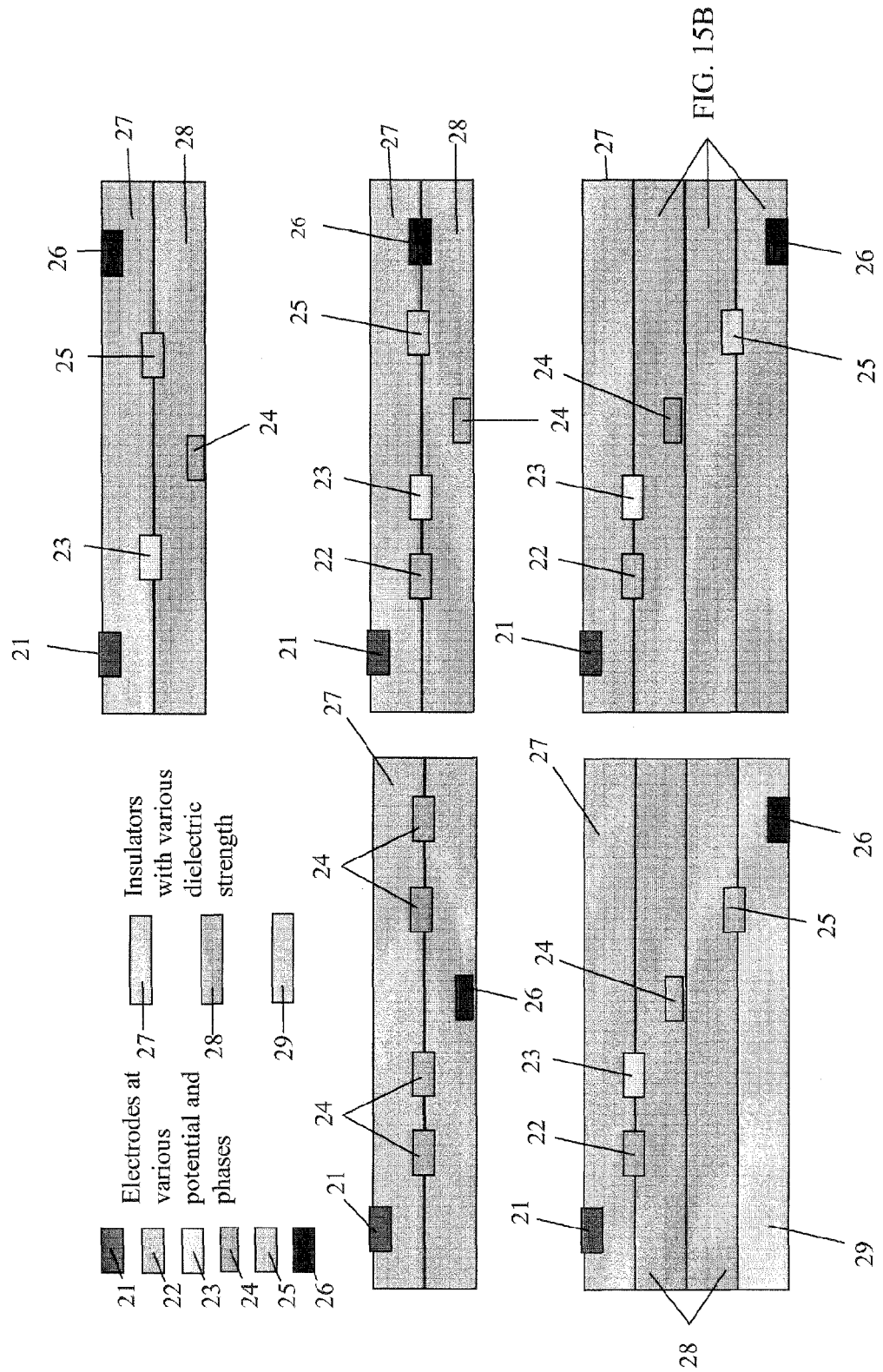
FIG. 14 illustrates several additional exemplary embodiments of the multilayer actuators of the present disclosure.

FIG. 14 illustrates several additional exemplary embodiments of the multilayer actuators in accordance with the subject invention, showing various geometric and electrical configurations. Various insulator materials such as KAPTON™ and TEFLON™ and their combinations, for example, can be utilized for minimum heat loss inside the dielectric material. Multilayer actuators of the present invention may have any number of insulation layers, insulation thicknesses, dielectric strengths, numbers of electrodes, electrode widths, inter-electrode gaps, applied frequencies, duty cycles, and voltages, for example. In an embodiment, such structures are applied to an interior surface of a micro channel, expansion slot, or other conduit to induce flow through the conduit.

Figure 15B:
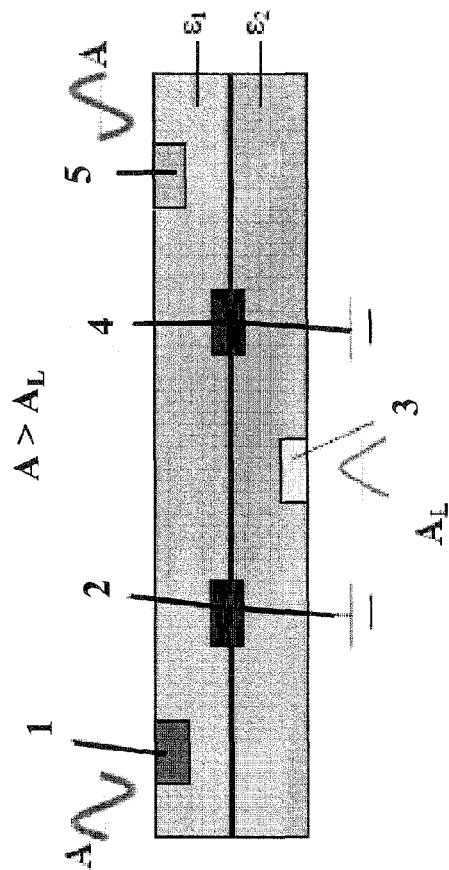
FIGS. 15A and 15B show specific embodiments of the invention having certain relationships between driving voltage and amplitudes and frequencies.
Figure 15A:
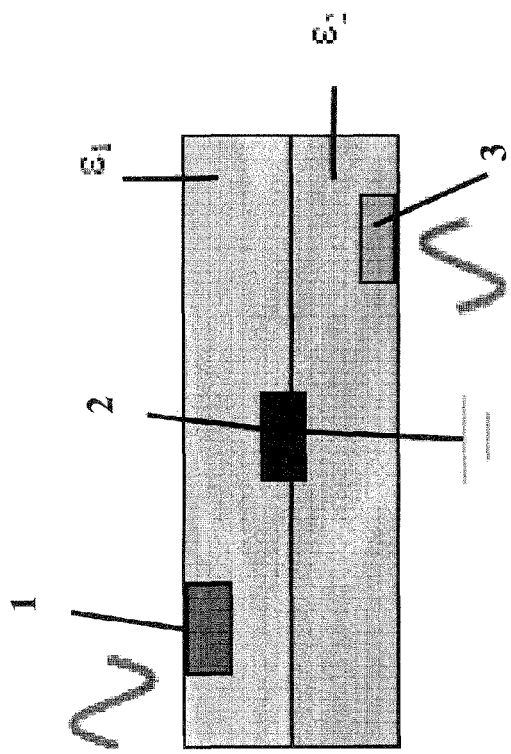

Referring to FIG. 15A, an embodiment is shown where the amplitude, A, and frequency, k, of the voltage applied between electrodes 1 and 2 and between electrodes 3 and 2 is the same. FIG. 15B shows an embodiment where the amplitude, $A_L$, and frequency, $k_L$, applied between electrodes 3 and 2 is different than the amplitude, A, and frequency applied between electrodes 1 and 2 and electrodes 5 and 4.

Figure 16B:
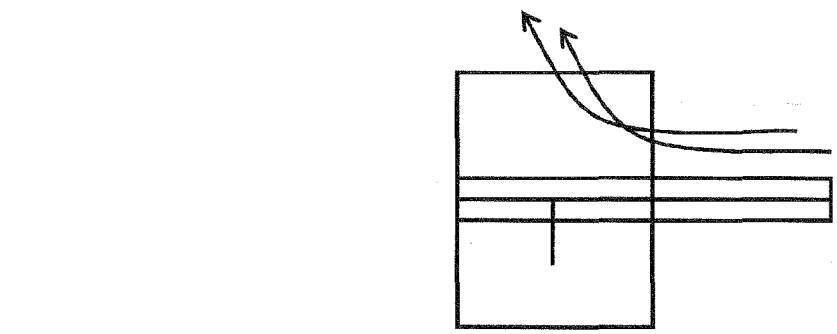
FIGS. 16A and 16B show specific embodiments of the invention for creating a flow force directed away from the substrate.
Figure 16B:
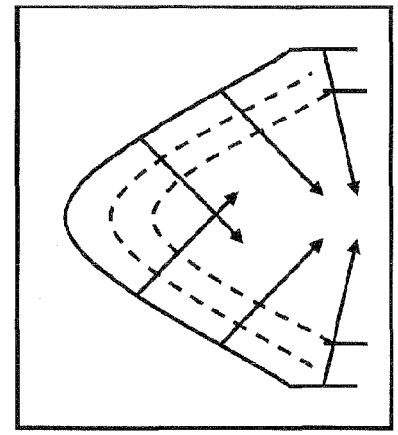
Figure 16A:
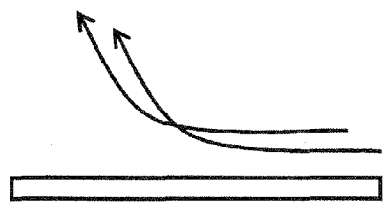
Figure 16A:
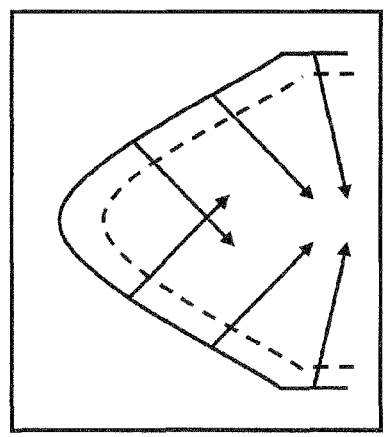

Additional embodiments of the invention can involve electrode structures incorporating curvatures or angles, such as triangle, square, or angle, with respect to the longitudinal dimension of the electrode pattern. Referring to FIGS. 16A and 16B, electrode patterns incorporating such curvatures are shown. FIG. 16A illustrates an electrode pattern having a cross-section as shown in the right side of FIG. 16A, where the longitudinal dimension of the electrode pattern incorporates a curvature, as shown on the left side of FIG. 16A. FIG. 16B shows an electrode pattern having a cross-section as shown in the right side of FIG. 16B, where the longitudinal dimension of the electrode pattern incorporates a curvature, as shown on the left side of FIG. 16B. The electrode patterns in FIGS. 16A and 16B can be used for bulk flow actuation and can create an upward body force away from the surface. The fluid receives a force from a plurality of directions such that fluid collides and is forced upward from surface or down toward surface. The arrows in FIGS. 16A and 16B show the direction of the flow when looking at a cross-section cut from the top to bottom of the respective electrode pattern with the ground electrode being on the inside of the curvature.

Figure 17B:
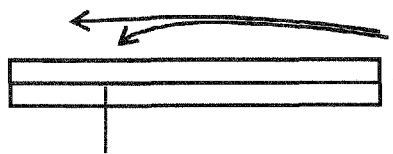
FIGS. 17A and 17B show specific embodiments of the invention for creating a flow force directed toward the substrate.
Figure 17B:
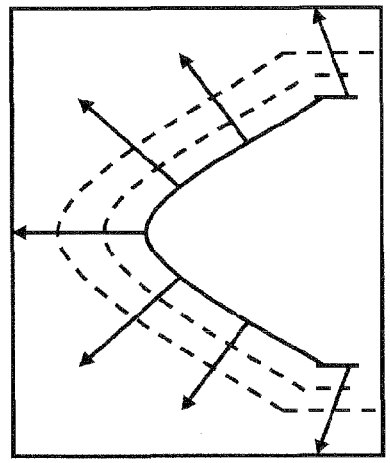
Figure 17A:
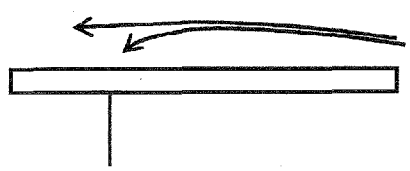
Figure 17A:
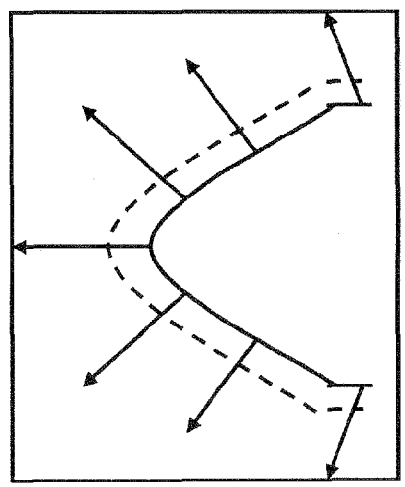

FIGS. 17A and 17B show the electrode patterns of FIGS. 16A and 16B, respectively, with the ground electrode being on the outside of the curvature in FIG. 17A and the electrode driven to create a body force from the inner electrode to the outer electrode. The arrows shown in FIGS. 17A and 17B show the flow created by driving the electrode structures in this manner.

FIG. 18 shows an electrode structure having a serpentine turbulator design in the longitudinal dimension. The arrows on the right side show the flow for a cross-section cut from top to bottom where the electrodes are driven to produce a body force from the outer electrode to the inner electrode with respect to one of the curved sections.

FIG. 19 shows another embodiment having a serpentine turbulator design in the longitudinal dimension where the electrodes have a different orientation from the electrode pattern in FIG. 18. The arrows show the flow for a cross-section out from top to bottom at a location where the body force is away from the surface.

Figure 20:
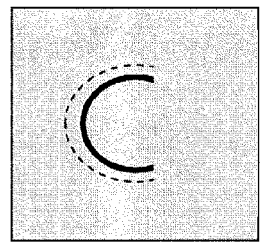
FIG. 20 shows various specific embodiments of the subject invention.
Figure 20:
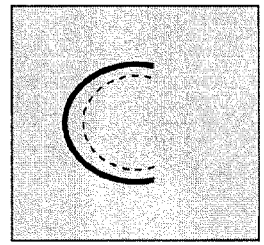
Figure 20:
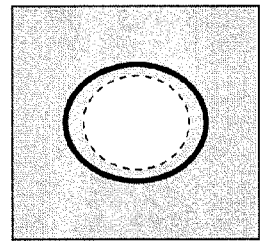
Figure 20:
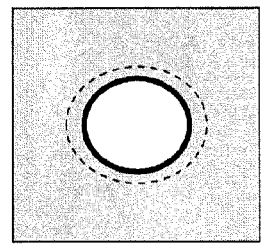
Figure 20:
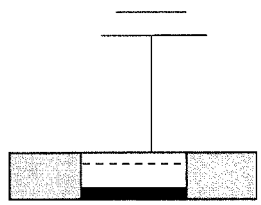
Figure 20:
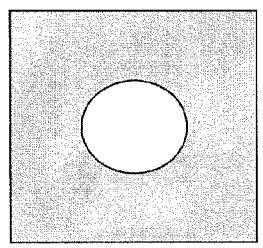

A variety of curvatures can be implemented in accordance with the subject invention. FIG. 20 shows additional embodiments of electrode patterns incorporating curvatures in the longitudinal dimension of the electrodes, including an electrode pattern surrounding an aperture in the substrate and an electrode pattern in the shape of a half circle. Other shapes include, but are not limited to, angles, triangles, rectangles, polygons, and other shapes that vary from straight. The electrode pattern surrounding the aperture can be designed and driven to pull flow up through the aperture or driven to force flow into the aperture. Likewise, the electrode pattern in the half circle can be designed and driven to force flow away from the substrate or designed and driven to pull flow toward the substrate.

Figure 21A:
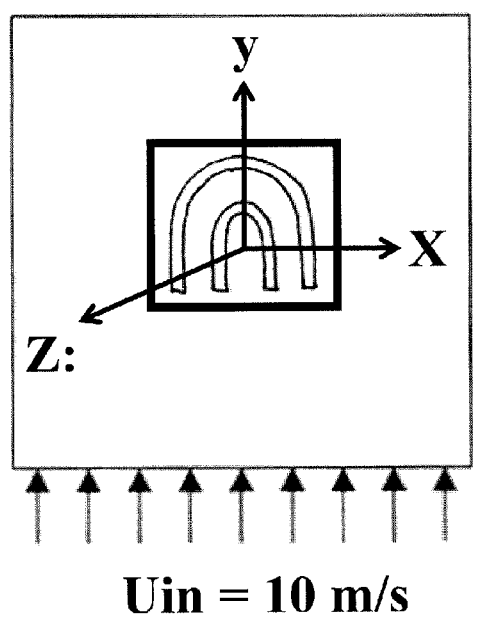
FIGS. 21A and 21B show an embodiment having a horseshoe shaped electrode pattern.
Figure 21B:
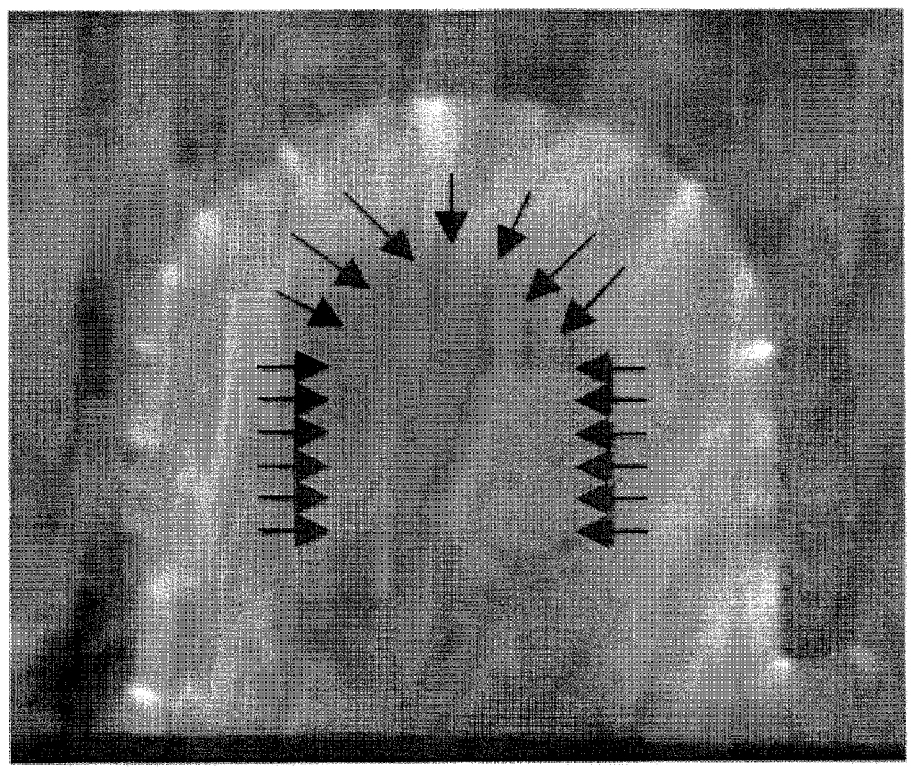
Figure 22:
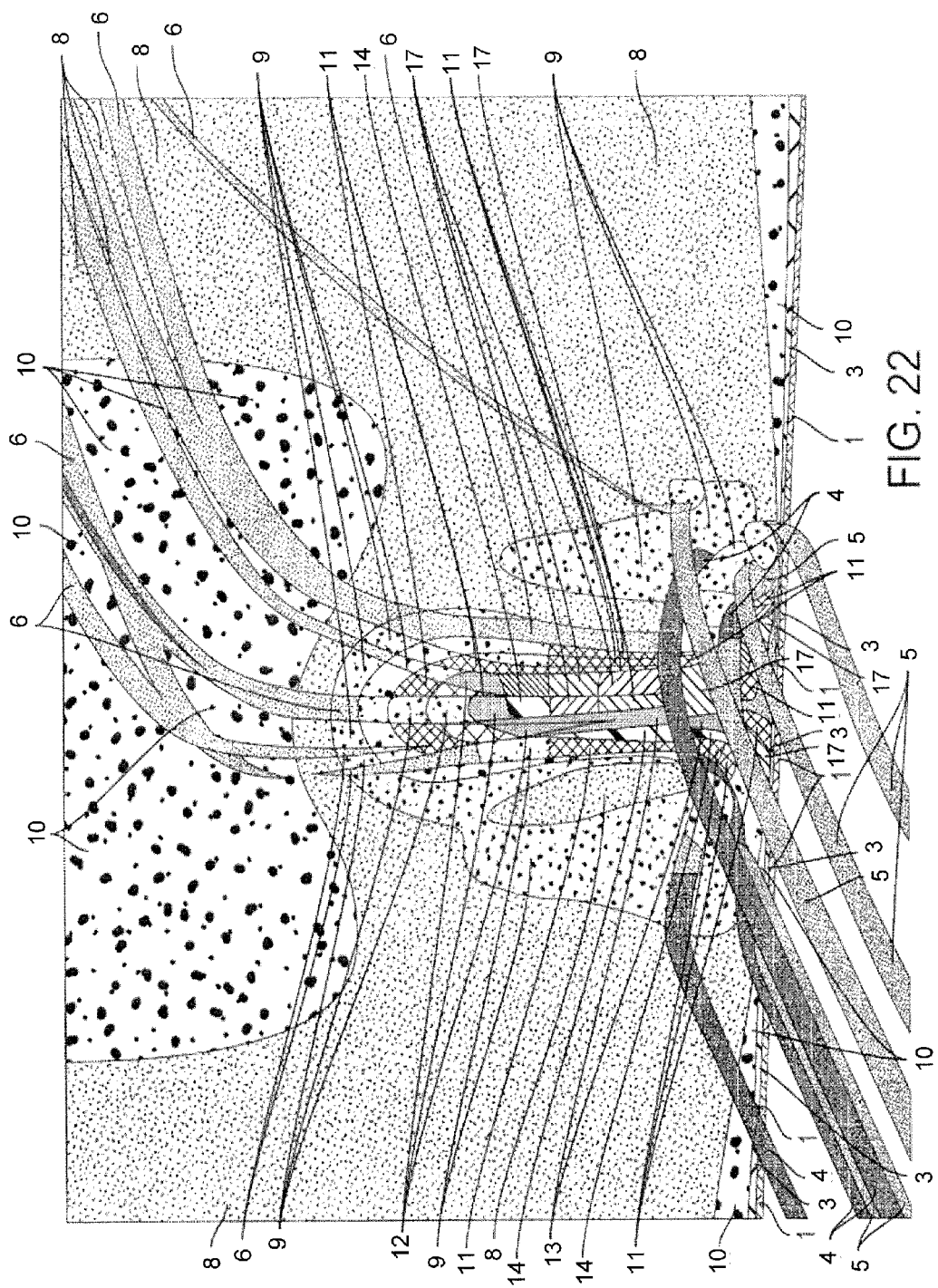
FIG. 22 shows a flow pattern for the embodiment of FIG. 21A.
Figure 23A:
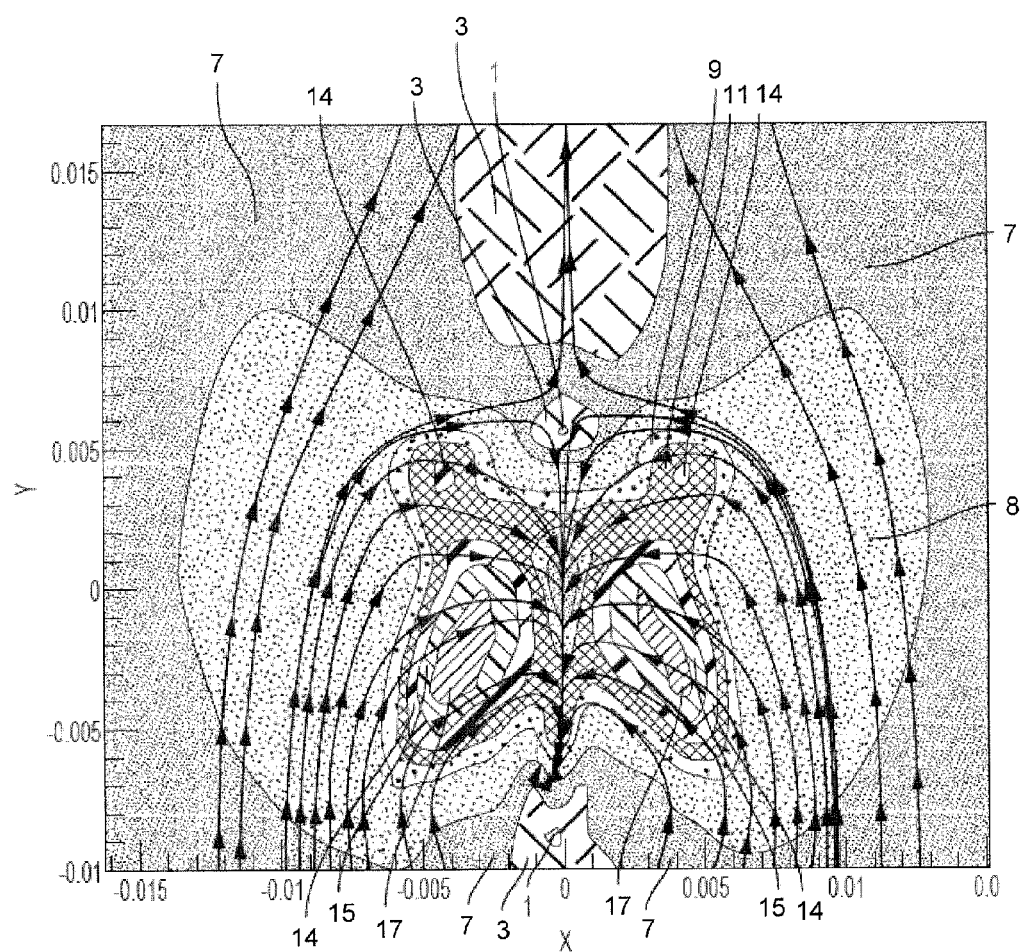
FIGS. 23A-23C show data illustrating the operation of the embodiment of FIG. 21A.
Figure 23B:
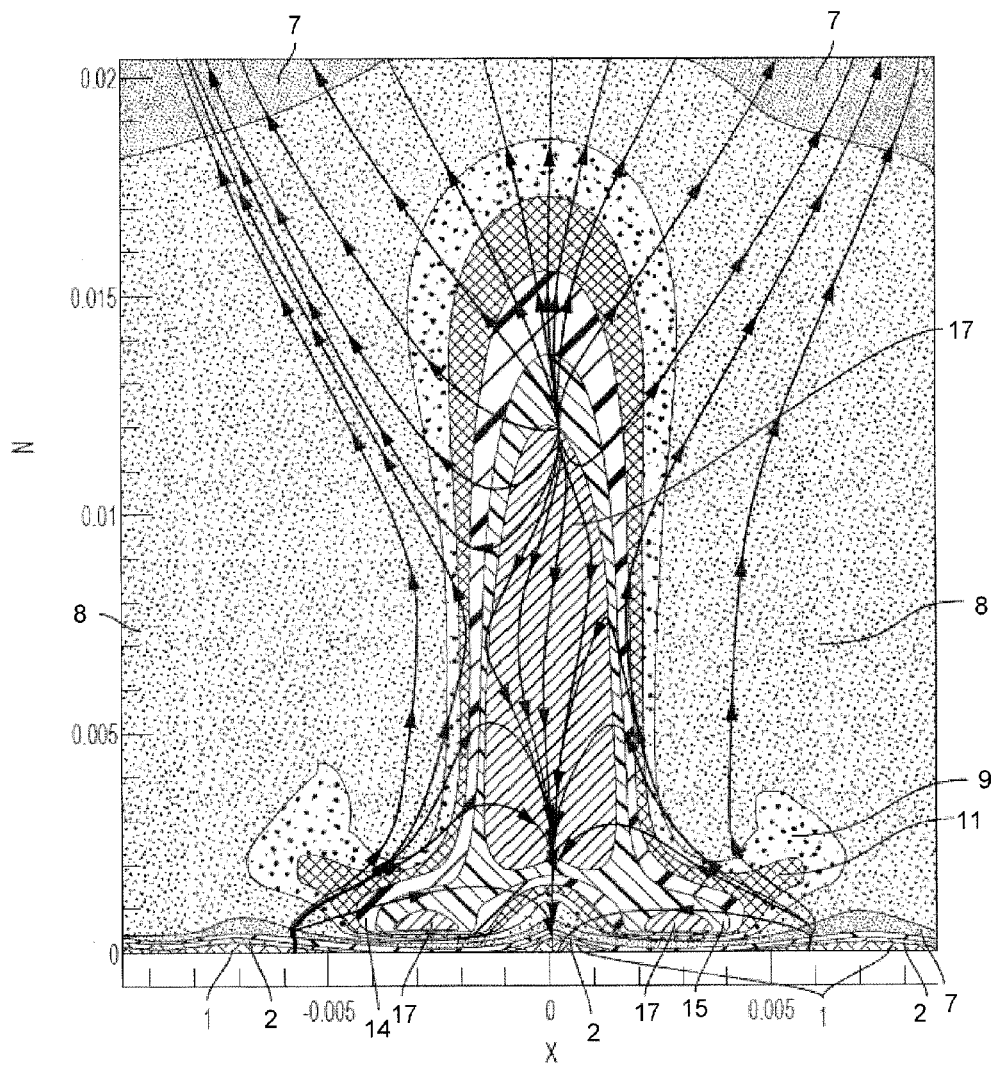
Figure 23C:
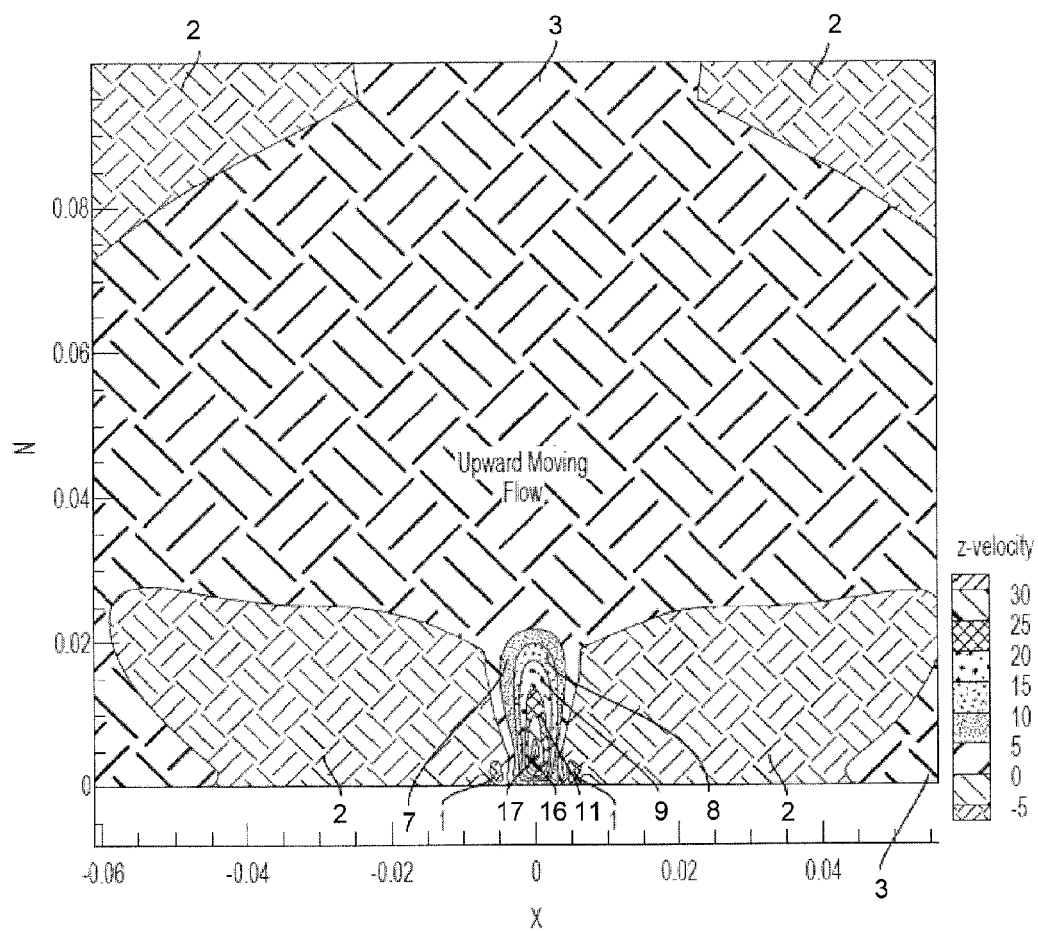

FIGS. 21A and 21B show an electrode pattern similar to the pattern in FIG. 16A and the corresponding glow pattern, respectively. The electrode pattern of FIG. 21A is driven to create the body force from the outer electrode to the inner electrode. FIG. 22 shows flow traces, and FIGS. 23A-23C show data illustrating the upward body force produced by this electrode pattern when driven in this matter where the summation of the flow-force creates an upward flow force.

In embodiments, such electrode patterns can be positioned on various surfaces of a propulsion system and powered to control flow of a propellant fluid through the system. For example, such electrodes can be positioned on a propellant tank, drain/fill valve, filter assembly, control valve, micro channel, expansion slot, or other conduit used in the propulsion system. Various illustrative examples are provided and discussed below. These examples are not meant to limit the subject invention.

Figure 24:
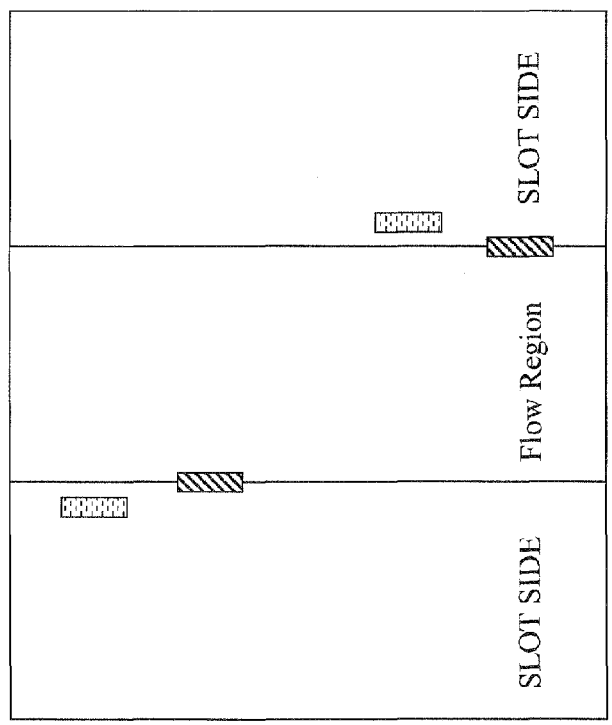
FIG. 24 shows a schematic diagram of a conduit configured to use a DBD in accordance with an embodiment of the subject invention.

FIG. 24 shows a schematic diagram of a conduit, such as a micro channel, expansion slot, or other conduit, configured to use a DBD in accordance with an embodiment of the subject invention. In the embodiment shown, two pairs of electrodes are formed in surfaces of the conduit. In an embodiment, the pairs of electrodes are powered to produce a DBD that induces flow of a propellant through the conduit. In an embodiment, the pairs of electrodes are powered in parallel. In an embodiment, the pairs of electrodes are powered sequentially. In an embodiment, multilayer actuators, such as the multilayer actuators discussed above, are formed in surfaces of the conduit.

Figure 25:
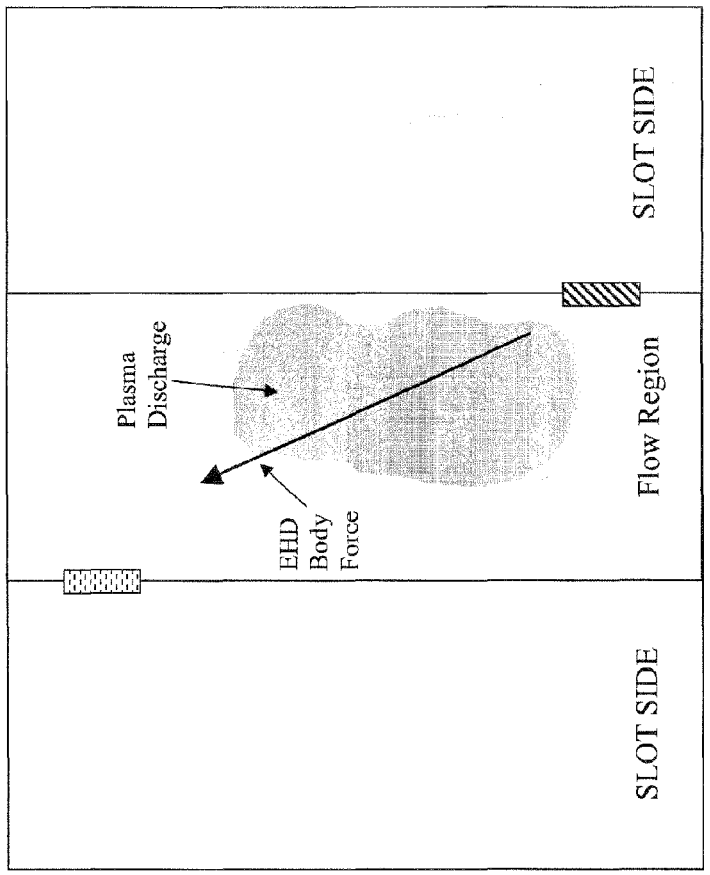
FIG. 25 shows a schematic diagram of a conduit using a volumetric plasma discharge in accordance with an embodiment of the subject invention.

FIG. 25 shows a schematic diagram of a conduit, such as a micro channel, expansion slot, or other conduit, using a volumetric plasma discharge in accordance with an embodiment of the subject invention. In the embodiment shown, a pair of electrodes is formed in surfaces of the conduit. In an embodiment, the pairs of electrodes are powered to generate a volumetric plasma discharge. The volumetric discharge in turn produces an EHD body force that induces flow of a propellant through the conduit.

Figure 26:
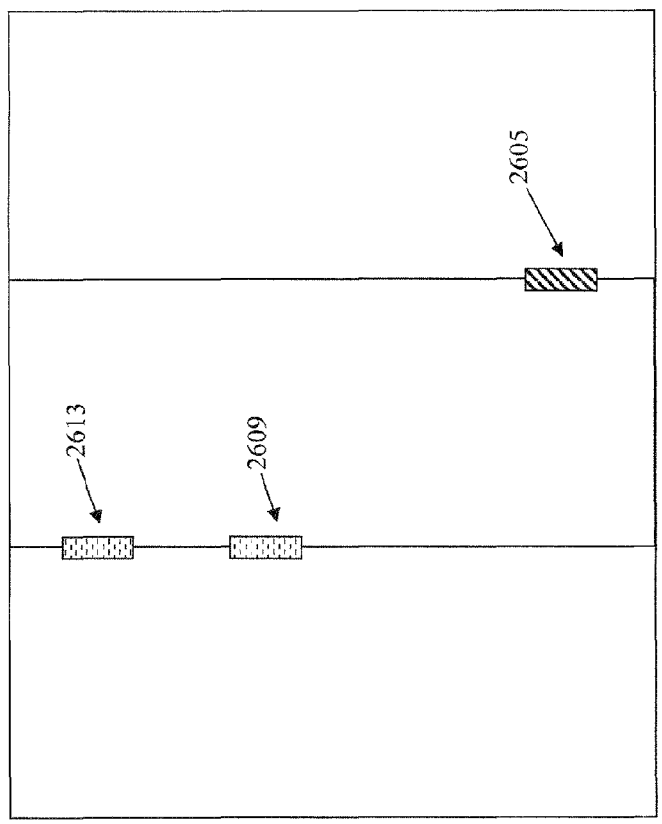
FIG. 26 shows a schematic diagram of a conduit configured to use volumetric plasma discharges in accordance with another embodiment of the subject invention.

FIG. 26 shows a schematic diagram of a conduit, such as a micro channel, expansion slot, or other conduit, configured to use volumetric plasma discharges in accordance with another embodiment of the subject invention. In the embodiment shown, three electrodes 2605, 2609, 2613 are formed on surfaces of the conduit. In an embodiment, the electrodes can be powered in pairs to produce volumetric plasma discharges within the conduit. In an embodiment, the electrode 2605 is first powered with the electrode 2609 to produce a first volumetric plasma discharge within the conduit. The electrode 2605 is later powered with the electrode 2613 to produce a second volumetric plasma discharge further down the conduit.

Figure 27:
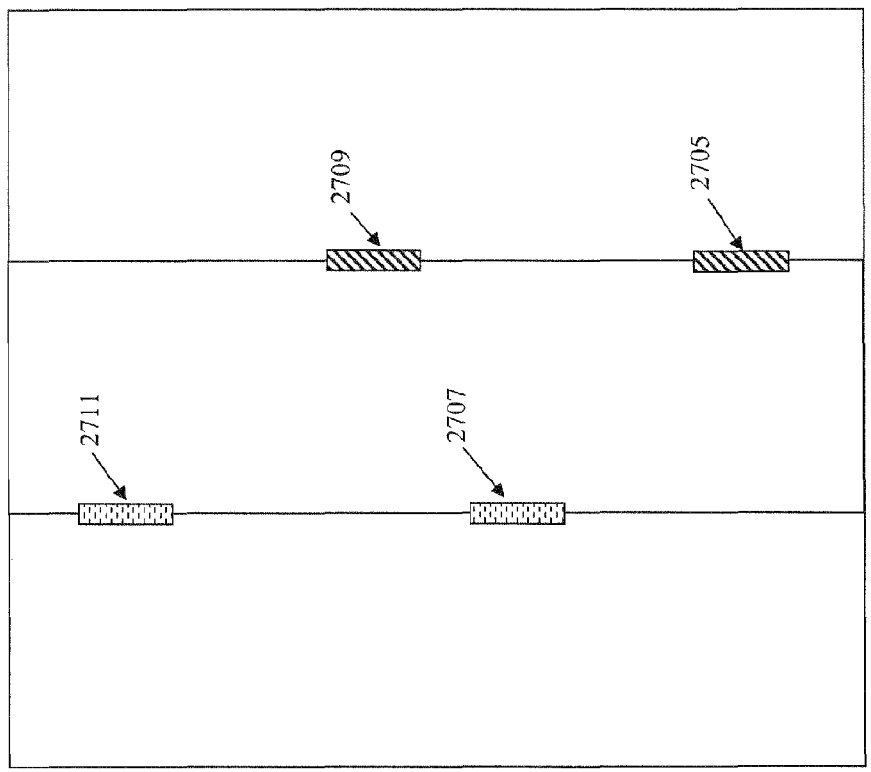
FIG. 27 shows a schematic diagram of a conduit configured to use volumetric plasma discharges in accordance with yet another embodiment of the subject invention.

FIG. 27 shows a schematic diagram of a conduit, such as a micro channel, expansion slot, or other conduit, configured to use volumetric plasma discharges in accordance with yet another embodiment of the subject invention. In the embodiment shown, four electrodes 2705, 2707, 2709, 2711 are formed on surfaces of the conduit. In an embodiment, the electrodes can be powered in pairs to produce volumetric plasma discharges within the conduit. In an embodiment, the electrode 2705 is first powered with the electrode 2707 to produce a first volumetric plasma discharge within the conduit. The electrode 2709 is later powered with the electrode 2711 to produce a second volumetric plasma discharge further down the conduit. In another embodiment, the pairs of electrodes (2705, 2707) and (2709, 2711) are powered simultaneously to produce simultaneous plasma discharges at multiple positions within the conduit. In a further embodiment, the electrode 2707 is also powered with the electrode 2709 to produce a third volumetric plasma discharge. In an embodiment, the electrodes are powered in a sequence of pairs (2705, 2707), (2707, 2709), (2709, 2711) to produce a series of three plasma discharges progressing down the conduit from the electrode 2705 toward the electrode 2711. In another embodiment, the electrode pairs (2705, 2707) and (2709, 2711) are powered simultaneously to produce simultaneous plasma discharges, and the electrode pair (2707, 2709) is later powered to produce a later plasma discharge. In an embodiment, the pattern of powering pairs of electrodes is repeated to produce repeated plasma discharges. In an embodiment, the repeated plasma discharges generate EHD body forces that induce flow of propellant molecules from the electrode 2705 toward the electrode 2711.

Figure 28:
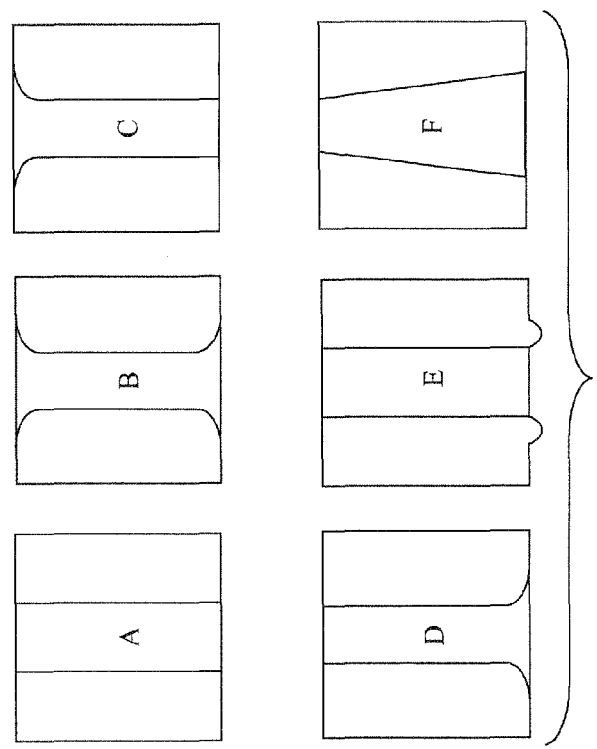
FIG. 28 shows various conduit configurations in accordance with embodiments of the subject invention.

FIG. 28 shows various conduit configurations in accordance with embodiments of the subject invention. The configurations shown can be applied to various conduits, such as the micro channels, expansion slots, or other conduits discussed above. As shown, such conduits can widen or narrow linearly or geometrically at one or both ends. The conduits can also narrow or widen along the entire length of the conduit. Such change can also be linear or geometric. As shown in FIG. 28E, such conduits can also have convex protrusions on one or both ends. In other embodiments, concave structures can also be formed at one or both ends of such conduits. Such structures can have various concave and/or convex shapes including square, rectangular, rounded, circular, elliptical, polygonal, among other shapes. In an embodiment, such structures facilitate flow of a propellant fluid through the conduit.

Figure 29:
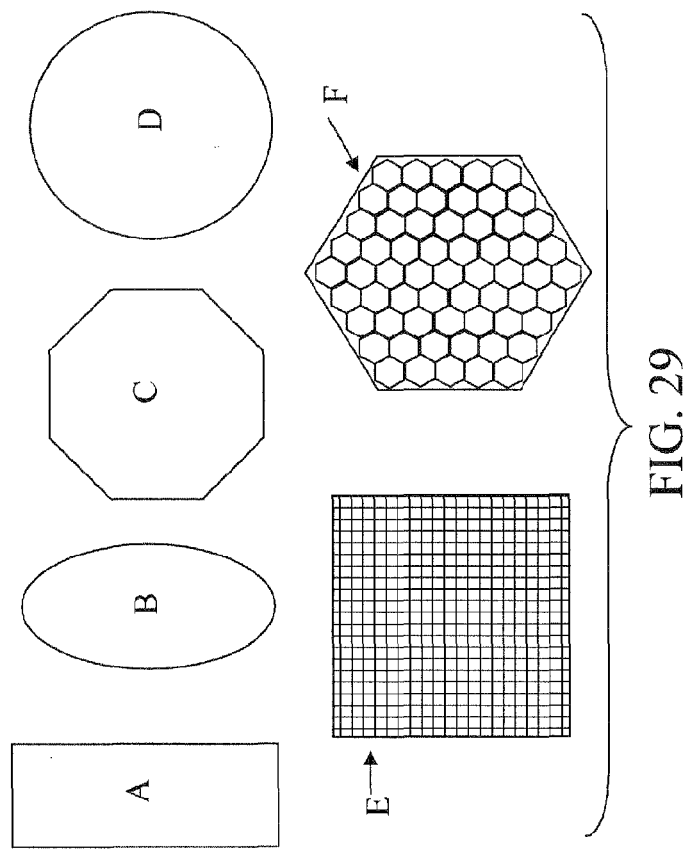
FIG. 29 shows various conduit cross-sections in accordance with embodiments of the subject invention.

FIG. 29 shows various conduit cross-sections in accordance with embodiments of the subject invention. The cross-sections shown can be used with various conduits, such as the micro channels, expansion slots, or other conduits discussed above. A variety of micro channel and/or slot cross-sections can be implemented. Examples of cross-sections include, but are not limited to, circular, square, rectangular, polygonal, hexagonal, or parallel plates or curves. Such conduits can have various cross-sections. In an embodiment, a channel or slot is formed having internal structures formed therein to further control flow through the channel or slot. For example, a honey comb structure can be used as shown in FIG. 29F.

In embodiments of the subject invention, EHD body forces can be used to pump fluid in a micro channel or other small conduit without any mechanical components. The actuators of the micropump according to some embodiments of the present invention can operate using (pulsed) dc and ac power supply and can apply large electrohydrodynamic (EHD) forces in a relatively precise and self-limiting manner. Further embodiments can have rapid switch-on/off capabilities. Specific embodiments can operate without any moving parts.

Figure 30:
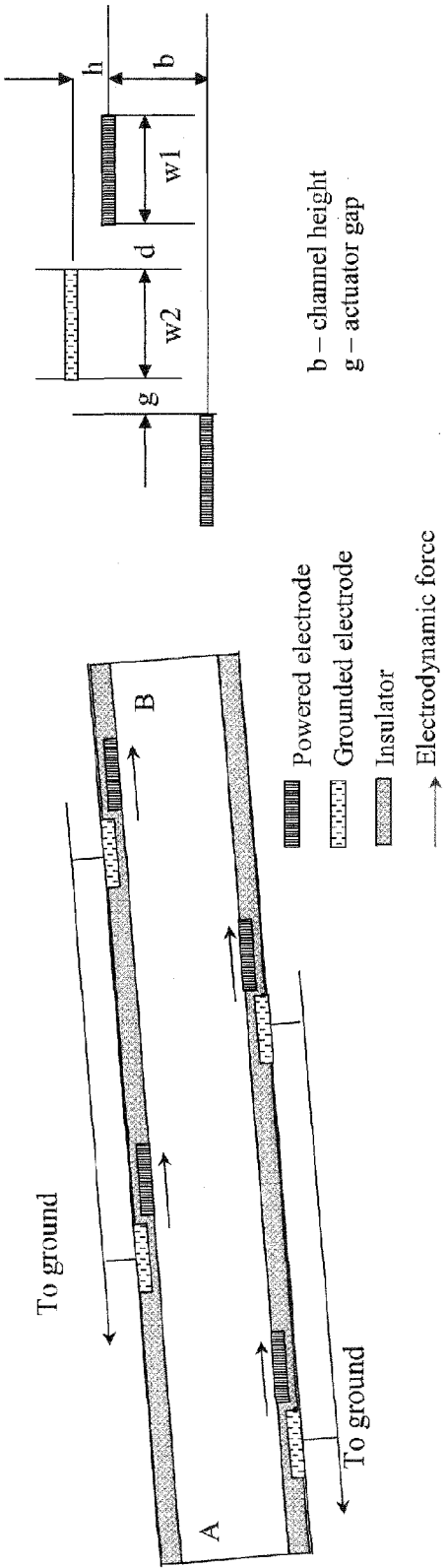
FIG. 30 shows a schematic of a conduit design according to an embodiment of the subject invention.
Figure 31:
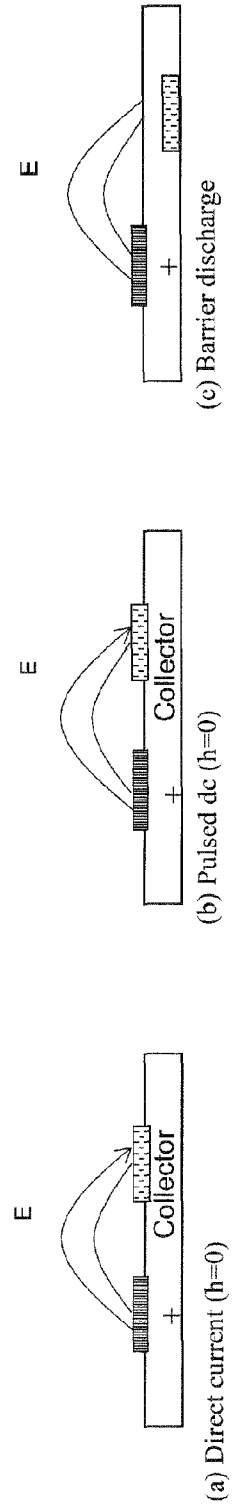
FIGS. 31A-31C illustrate different arrangements of electrodes in a conduit according to embodiments of the subject invention.
Figure 32B:
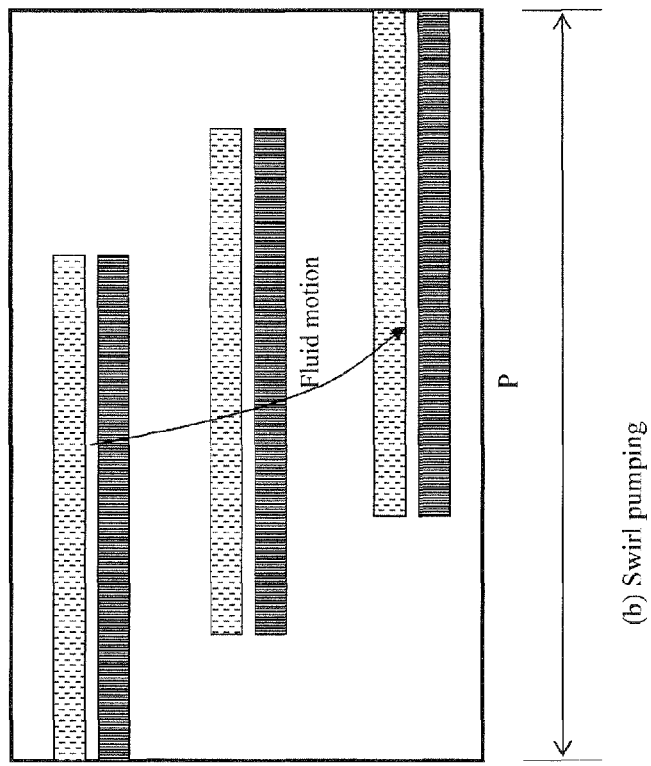
FIGS. 32A and 32B illustrate different positioning of electrodes along the inner perimeter P of a conduit for creating straight and swirl pumping effects, according to embodiments of the subject invention, where the inner surface of the conduit has been laid out flat for illustration purposes.
Figure 32A:
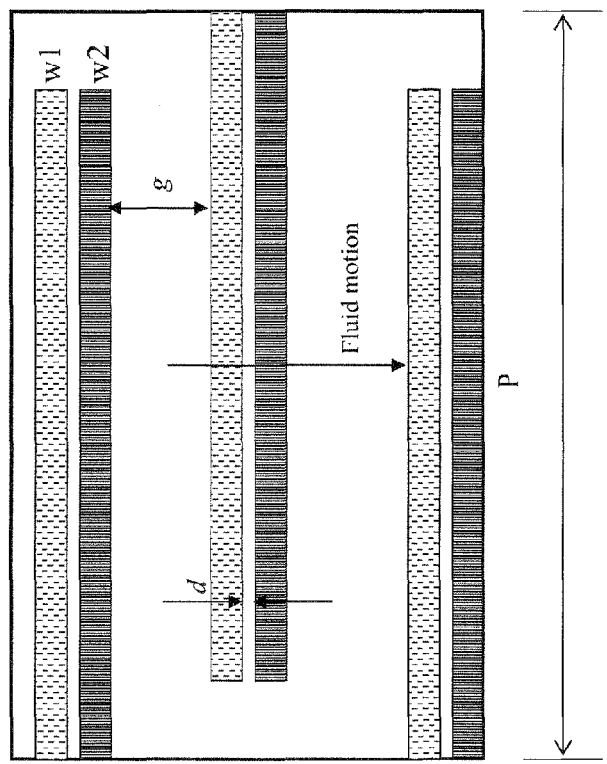
Figure 33B:
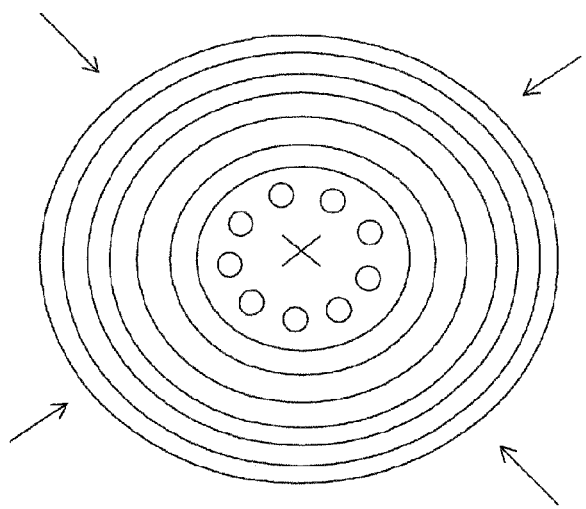
FIGS. 33A and 33B show embodiments incorporating parallel plate flow conduits.
Figure 33A:
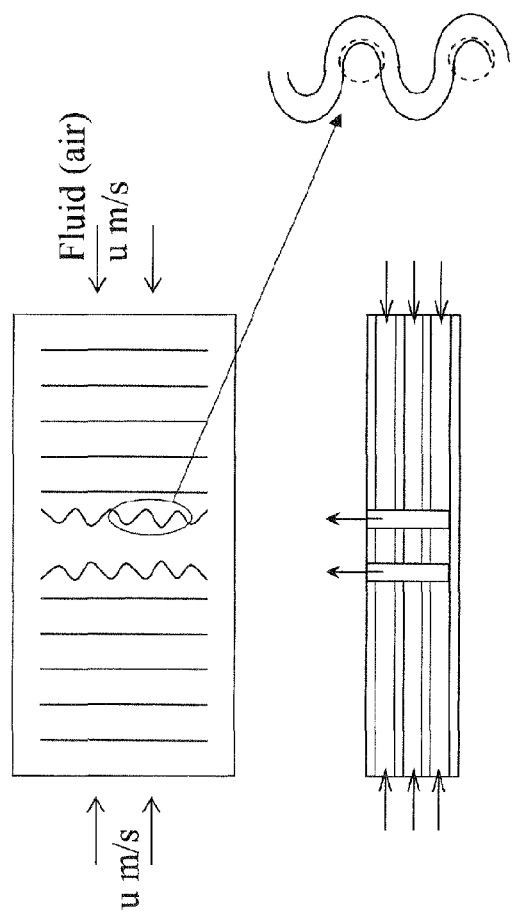

As discussed above in relation to FIG. 29, a variety of conduit cross-sections can be implemented. FIG. 30 can represent a cross-section through a conduit, such as micro channel, expansion slot, or other conduit, having a circular, rectangular, or other shape cross-section, or a parallel plate configuration. FIGS. 32A and 32B can represent a laid open conduit having a circular, rectangular, or other shaped cross-section, or a plate of a parallel plate configuration. FIGS. 33A and 33B show embodiments incorporating parallel plate flow conduits. The top portion of FIG. 33A shows a top of one of the plates of a parallel plate conduit device. Each line shown represents an electrode pair, such as the electrode pairs shown in FIG. 31, with the blown-up drawing section showing a curved electrode pair that can act to direct the flow of the fluid away from the surface. The fluid located in the dotted region of the blown-up drawing section experiences forces from the electrode pair converging from the curved structure of the electrode pairs such that when the fluid is pushed away from the curved electrode pair, the fluid is pushed away from the surface of the plate. The dotted region of the blown-up drawing section can also have an aperture through the plate such that when fluid is pushed up from the plate below, the fluid travels through the plate and is continued to be pushed up. The bottom portion of FIG. 33A shows a side view of a stack of parallel plates having apertures through the top three plates such that fluid flows from the right and left, due to the force from multiple electrode pairs and is directed up as shown by the arrows exiting the apertures in the top plate.

The plates in the stack of plates in FIG. 33A can have a variety of shapes, such as square, rectangular, oval, circular, hexagonal, or polygonal. FIG. 33B shows a specific embodiment having oval shaped plates, where the "X" in the center of the figure indicates the flow of the propellant fluid is out of the paper. FIG. 33B shows multiple apertures through one of the plates, which can optionally coincide with apertures in other plates. Various configurations of apertures in the plates can be implemented. FIG. 33B also shows concentric electrode pairs that create forces on the fluid, for example, to push the fluid toward the center of the device. In an embodiment, fluid is pulled in along the outer edges of the oval plates, pushed toward the center, and then directed up through the apertures. In a specific embodiment, the spacing between the plates shown in FIGS. 33A and 33B can be such that electrode pairs located on the surface of one or both plates creating the parallel plate flow orifices can create a bulk flow effect to move the fluid through the parallel plate flow orifice.

FIG. 30 shows a longitudinal cross-section of a conduit, such as a micro channel, expansion slot, or other conduit, according to an embodiment of the present invention. In one embodiment, the conduit material can be an insulator and can have a channel height b. The pumping of fluids through the conduit may be accomplished utilizing electromagnetic effects such as an electrohydrodynamic body force and/or a magnetohydrodynamic effect through a Lorentz force. The forces can be induced using dynamic barrier discharge (DBD) electrodes. As illustrated in FIG. 30, the conduit can be asymmetrically coated with electrode pairs. An electrode pair including a powered electrode having a width w1 and a grounded electrode having a width w2 can be formed adjacent each other and separated by a distance d. The electrode pair can be a DBD electrode pair, where the grounded electrode and the powered electrode can be separated a distance h by an insulator. In an embodiment, the electrode pair is separated by a wall of the conduit, or portion thereof. These electrode pairs can be formed at intervals along the conduit. For example, the electrode pairs can be asymmetrically formed along the conduit at intervals with an actuator gap g.

In an embodiment, the powered electrodes can be exposed along the inner perimeter of the conduit. In another embodiment, the powered electrodes can have a coating separating the powered electrode from the fluid. Various embodiments can be applied to any fluids that can be ionized, such as air, gases, and liquids. For electrically non-conductive fluids, the electrode of the electrode pair near the surface can be exposed to the fluid, but a cover can be positioned over the electrode if desired. For electrically conductive fluids, a cover, such as dielectric coating, can be placed over the electrode near the surface. This cover can improve safety.

In operation, a small plasma discharge can be generated in the vicinity of the exposed (powered) electrode to induce an amount of electrohydrodynamic (EHD) body force to push gas/liquid in a certain direction. A magnetic field can also be used to induce additional magnetohydrodynamic (MHD) effect through Lorentz force. In a specific embodiment, the magnetic field can be oriented such that the current flow of the gas and/or liquid crossed with the direction of the magnetic field creates a force away from the surface of the conduit, so as to pinch the fluid along. The net result can be very efficient movement of fluid through the conduit.

The electrode pairs can be powered and formed in various configurations. FIG. 31 shows examples of electrode arrangements that can be incorporated in embodiments of the present invention. FIGS. 31A and 31B show an electrode pair with both electrodes on the same surface, where h=0. FIG. 31A illustrates the electrode pair as being maintained at a potential bias using steady direct current, and FIG. 31B illustrates the electrode pair as being maintained at a potential bias using pulsed direct current. In another embodiment, alternating current can be used. FIG. 31C shows an electrode pair separated by an insulator layer. The electrode pair of FIG. 31C can also be referred to as barrier discharge electrodes where one electrode can be powered with dc or ac operating at a radio frequency. The powered electrode can be exposed to the gas, but embodiments can be provided where the powered electrode is not exposed to the gas.

In operation, electric forces can be generated between the electrodes. As the applied voltage becomes sufficiently large for a given interelectrode distance d and pressure p, the dielectric surface adjacent to the electrode can produce a surface discharge weakly ionizing the surrounding gas. The plasma can cause an energy exchange between charged and neutral species. In this discharge, microfilaments of nanosecond duration with many current pulses in a half cycle can maintain the optical glow. Due to a combination of electrodynamic and collisional processes, charge separated particles induce the gas particles to move.

FIGS. 32A-32B show details along the inner perimeter of a flow conduit. FIG. 32A shows an example of a periodic pattern for implementing straight pumping. FIG. 32B shows an example of a step pattern for swirl pumping. In a specific embodiment, each electrode pair along the length of the flow conduit can rotate with respect to the electrode pair before it, around the longitudinal axis of the flow conduit, as shown in FIG. 32B, so as to create a swirl flow pattern.

Various conduit configurations can be used with the subject invention as discussed above including various dimensions, geometry, electrode arrangements, and powering schemes.

Figure 34:
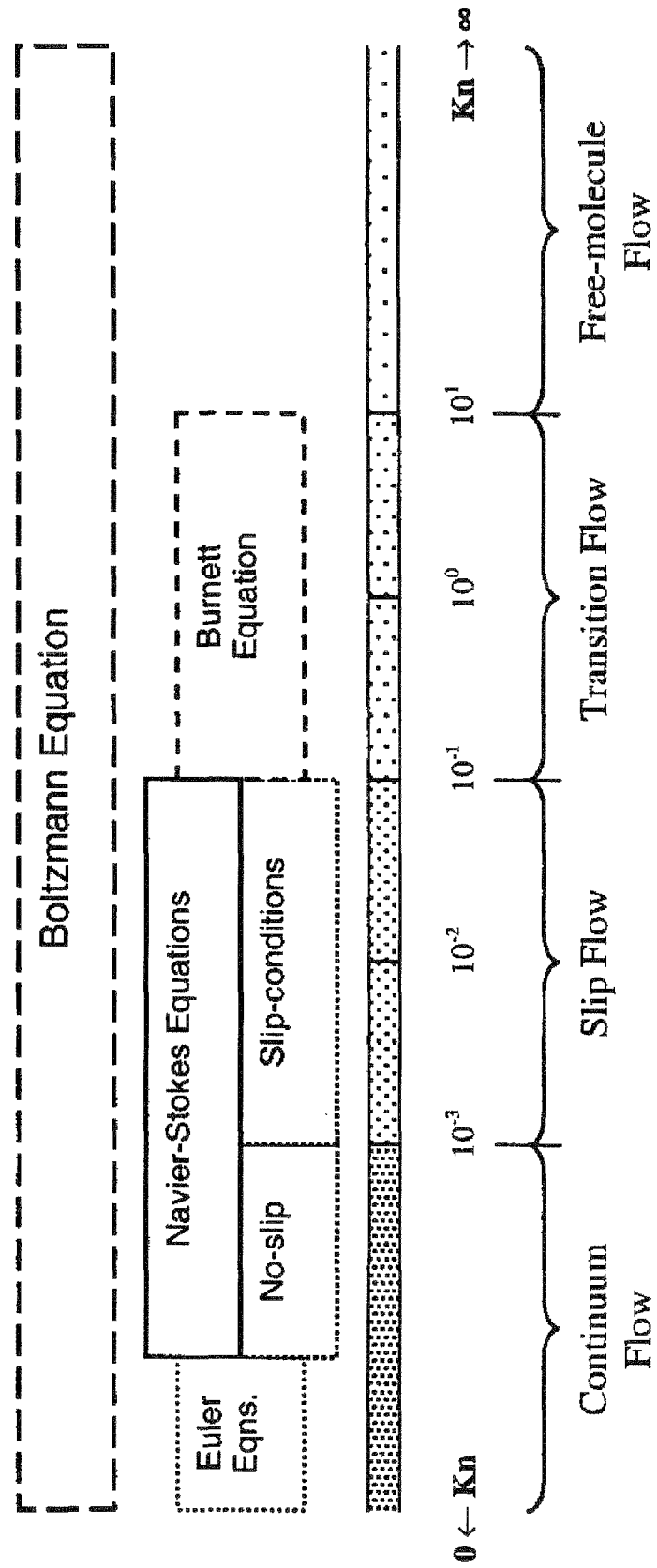
FIG. 34 shows Knudsen number regimes for modeling fluid flow through a conduit in accordance with embodiments of the subject invention.

FIG. 34 shows Knudsen number regimes for modeling fluid flow through a micro channel or expansion slot in accordance with embodiments of the subject invention. Subrata Roy and Reni Raju discussed modeling fluid flow through such structures in Roy & Raju, *Modeling Gas Flow through Microchannels and Nanopores*, 93 Journal of Applied Physics 4870 (2003) and Raju & Roy, *Modeling Single Component Fluid Transport through Micro Channels and Free Molecule Micro-Resistojet*, AIAA-2004-1342 (2004), which are hereby incorporated by reference for that purpose.

The paper Raju & Roy, *Modeling Single Component Fluid Transport through Micro Channels and Free Molecule Micro-Resistojet*, AIAA-2004-1342 (2004) also discusses fabrication of MEMS devices. Riki H. Lee and others discussed fabrication of MEMS devices suitable for inclusion in propulsion systems in Lee, et al, *Free Molecule Micro-Resistojet: Nanosatellite Propulsion*, AIAA 2005-4073 (2005). Both of these papers are hereby incorporated by reference for that purpose. As will be understood by one skilled in the art, in accordance with standard MEMS fabrication techniques, micro channels or expansion slots can be fabricated by building up and/or etching materials deposited on a substrate. Electrodes can be incorporated into such layers to achieve the configurations shown and discussed above. Other methods of achieving such configurations may be possible and can be used with the subject invention.

Figure 35:
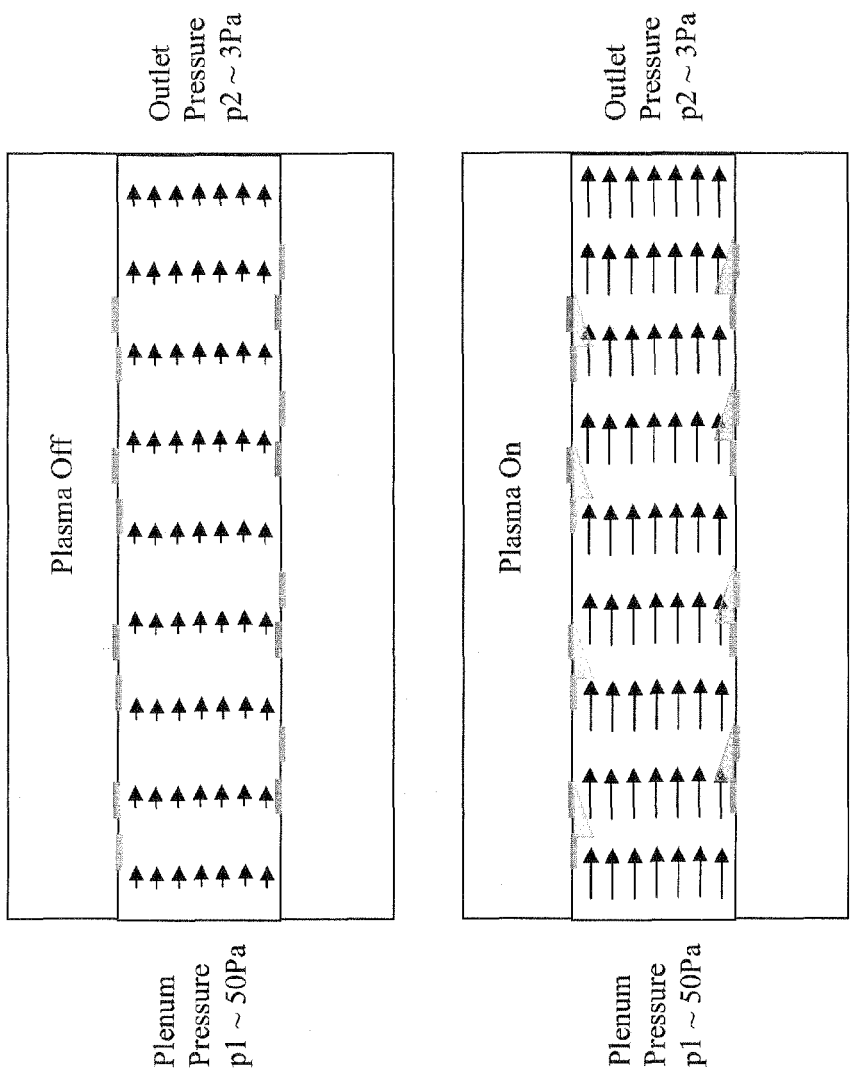
FIG. 35 shows the flow through a micro channel with the plasma off (top) and with the plasma on (bottom).

FIG. 35 shows a cross-section of a channel or expansion slot having a plurality of electrode pairs on each of two walls, or sides, with a propellant fluid flowing in between the two walls and in contact with the two walls. FIG. 35 shows the case with the plasma discharge turned off (top) and the case with the plasma discharge turned on (bottom), where the length of the arrows showing the flow are longer for higher speed flows.

Aspects of the invention may be described in the general context of computer-executable instructions, such as program modules, being executed by a computer. Generally, program modules include routines, programs, objects, components, data structures, etc., that perform in particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A propulsion system for space application comprising:
   a thruster comprising:
      a slot shaped micro channel having an inlet and an outlet which define a thrust axis along a downstream direction, the micro channel comprising a first wall and a second wall that faces and is opposite the first wall, wherein the micro channel is configured to receive a propellant at the inlet and to exhaust propellant at the outlet;
      a first electrode pair comprising a first electrode and a second electrode, the first electrode mounted on or embedded in the first wall and the second electrode mounted on or embedded in the second wall, the second electrode being downstream of the first electrode;
      a power supply configured to provide a first voltage between the first electrode and the second electrode to create a first glow discharge in the propellant, the power supply and first electrode pair further configured to accelerate the propellant via a first electrohydrodynamic effect along the thrust axis to generate thrust.

2. The satellite propulsion system of claim 1, further comprising: an expansion slot at the outlet, wherein the expansion slot is configured to expand and accelerate the propellant.

3. The satellite propulsion system of claim 1, wherein the first wall and the second wall diverge in the downstream direction.

4. The satellite propulsion system of claim 1, wherein the first voltage alternates at a radio frequency.

5. The satellite propulsion system of claim 1, wherein the first electrode and the second electrode are separated from each other by an electrically insulating solid material.

6. The satellite propulsion system of claim 1, wherein at least one of the first electrode and the second electrode is electrically insulated from the propellant.

7. The satellite propulsion system of claim 1, wherein at least one of the first electrode and the second electrode is in electrical contact with the propellant.

8. The satellite propulsion system of claim 1, further comprising: a plenum chamber configured to provide propellant to the inlet.

9. The satellite propulsion system of claim 8, wherein the plenum chamber is made of TEFLON™.

10. The satellite propulsion system of claim 1, further comprising a second electrode pair comprising a third electrode and a fourth electrode, the fourth electrode being upstream or downstream of the third electrode, wherein the third electrode is mounted on or embedded in the first wall and the fourth electrode is mounted on or embedded in the second wall, wherein the power supply is further configured to provide a second voltage between the third electrode and the fourth electrode to create a second glow discharge in the propellant, the power supply and second electrode pair are further configured to accelerate the propellant via a second electrohydrodynamic effect along the thrust axis to generate thrust.

11. The satellite propulsion system of claim 10, wherein the first voltage and the second voltage alternate at a radio frequency.

12. A method of propelling an apparatus in space having the propulsion system for space application of claim 1 comprising the steps of:
   providing propellant at the inlet;
   applying the first voltage between the first electrode and the second electrode thereby creating the first glow discharge in the propellant and accelerating the propellant along the thrust axis to provide the thrust via the first electrohydrodynamic effect.

13. An apparatus comprising the propulsion system for space application according to claim 1, for propelling the apparatus.

14. The propulsion system for space application according to claim 1, further comprising a magnet configured to apply magnetohydrodynamic body force to the propellant.

15. The satellite propulsion system according to claim 1, wherein the first pair of electrodes and power supply are further configured to reduce shear forces on at least one of the first wall and the second wall due to the flow of the propellant.

16. The propulsion system for space application to claim 1, wherein the propellant is an electrically non-conducting fluid.

17. The propulsion system for space application according to claim 1, wherein the propellant is an electrically conducting fluid.

18. The propulsion system for space application according to claim 1, wherein the thruster is configured to produce thrust in the range of 0.8 to 1.7 mN.

19. The propulsion system for space application according to claim 1, wherein the propellant comprises one or more of the following: Helium gas, Argon gas, Nitrogen gas, and water vapor.

20. The propulsion system for space application according to claim 1, wherein the thruster is made of Silicon, a Dioxide compound, and a Nitride compound.

21. A propulsion system for space application comprising: a thruster comprising:
    a chip having a slot shaped channel, the channel having an inlet and an outlet which define a thrust axis along a downstream direction, the channel comprising a first wall and a second wall that faces and is opposite the first wall, wherein the channel is configured to receive a propellant at the inlet and to exhaust propellant at the outlet;
    a first electrode pair comprising a first electrode and a second electrode, wherein the first electrode pair is mounted on or embedded in one of either the first wall or the second wall, the second electrode being downstream of the first electrode;
    a heating element, mounted to the chip and configured to heat the chip;
    a power supply configured to provide a first voltage between the first electrode and the second electrode to create a first glow discharge in the propellant, the power supply and first electrode pair further configured to accelerate the propellant via a first electrohydrodynamic effect along the thrust axis to generate thrust.

22. The propulsion system for space application of claim 21, further comprising: an expansion slot at the outlet, wherein the expansion slot is configured to expand and accelerate the propellant.

23. The propulsion system for space application of claim 21, wherein the first wall and the second wall diverge in the downstream direction.

24. The propulsion system for space application of claim 21, wherein the first voltage alternates at a radio frequency.

25. The propulsion system for space application of claim 21, wherein the first electrode and second electrode are separated from each other by an electrically insulating solid material.

26. The propulsion system for space application of claim 21, wherein at least one of the first electrode and the second electrode is electrically insulated from the propellant.

27. The propulsion system for space application of claim 21, wherein at least one of the first electrode and the second electrode is in electrical contact with the propellant.

28. The propulsion system for space application according to claim 21, wherein the propellant is an electrically non-conducting fluid.

29. The propulsion system for space application according to claim 21, wherein the propellant is an electrically conducting propellant.

30. The propulsion system for space application according to claim 21, wherein the thruster is configured to produce a thrust in the range of 0.8 to 1.7 mN.

31. The propulsion system for space application according to claim 21, wherein the propellant comprises one or more of the following: Helium gas, Argon gas, Nitrogen gas, and water vapor.

32. The propulsion system for space application m according to claim 21, wherein the chip is made of Silicon, a Dioxide compound, and a Nitride compound.

33. The propulsion system for space application of claim 21, further comprising: a plenum chamber configured to provide propellant to the inlet.

34. The propulsion system for space application of claim 33, wherein the plenum chamber is made of TEFLON™.

35. The propulsion system for space application of claim 21, further comprising a second electrode pair comprising a third electrode and a fourth electrode downstream of the third electrode, wherein the third electrode and the fourth electrode are both mounted on or embedded in one of either the first wall or the second wall, wherein the power supply is further configured to provide a second voltage between the third and the fourth electrode to create a second glow discharge in the propellant, and wherein the power supply and second electrode pair are further configured to accelerate the propellant via a second electrohydrodynamic effect along the thrust axis to generate thrust.

36. The propulsion system for space application of claim 35, wherein the first voltage and second voltage alternate at a radio frequency.

37. A method of propelling an apparatus in space having the propulsion system for space application of claim 21 comprising the steps of:
    providing the propellant at the inlet;
    applying the first voltage between the first electrode and the second electrode thereby creating the first glow discharge in the propellant and accelerating the propellant along the thrust axis to generate thrust via the first electrohydrodynamic effect.

38. The propulsion system for space application according to claim 21, further comprising a magnet configured to apply a magnetohydrodynamic body force to the propellant.

39. The propulsion system for space application according to claim 21, wherein the first pair of electrodes and power supply are further configured to reduce shear forces on at least one of the first wall and the second wall due to the flow of the propellant.

40. An apparatus comprising the propulsion system for space application according to claim 21, for propelling the apparatus.

* * * * *

UNITED STATES PATENT AND TRADEMARK OFFICE
CERTIFICATE OF CORRECTION

PATENT NO. : 9,228,570 B2
APPLICATION NO. : 13/578797
DATED : January 5, 2016
INVENTOR(S) : Subrata Roy It is certified that error appears in the above-identified patent and that said Letters Patent is hereby corrected as shown below:

In the Claims

Column 4,
Line 42, "with de" should read --with dc--.

Column 19,
Line 59, "with de" should read --with dc--.

Signed and Sealed this
Sixteenth Day of August, 2016

Michelle K. Lee
*Director of the United States Patent and Trademark Office*